US011409099B2

(12) United States Patent
Ducellier et al.

(10) Patent No.: US 11,409,099 B2
(45) Date of Patent: *Aug. 9, 2022

(54) OPTICAL APPARATUS

(71) Applicant: Honeywell Limited Honeywell Limitée, Mississauga (CA)

(72) Inventors: Thomas Ducellier, Ottawa (CA); Alan Scott, Arnprior (CA); Sheng Hai Zheng, Ottawa (CA)

(73) Assignee: Honeywell Limited Honeywell Limitée, Mississauga (CA)

( * ) Notice: Subject to any disclaimer, the term of this patent is extended or adjusted under 35 U.S.C. 154(b) by 13 days.

This patent is subject to a terminal disclaimer.

(21) Appl. No.: 17/005,649

(22) Filed: Aug. 28, 2020

(65) Prior Publication Data

US 2021/0263299 A1     Aug. 26, 2021

Related U.S. Application Data

(63) Continuation-in-part of application No. 16/881,338, filed on May 22, 2020.

(Continued)

(51) Int. Cl.
*H04B 10/00* (2013.01)
*G02B 26/08* (2006.01)
(Continued)

(52) U.S. Cl.
CPC ........... *G02B 26/0833* (2013.01); *G03H 1/02* (2013.01); *H04B 10/40* (2013.01); *G03H 2001/0224* (2013.01)

(58) Field of Classification Search
CPC . H04B 10/118; H04B 10/112; H04B 10/1123; H04B 10/1125; H04B 10/1129;
(Continued)

(56) References Cited

U.S. PATENT DOCUMENTS

| 4,439,012 A | 3/1984 | Christy |
| 5,004,331 A | 4/1991 | Haseltine et al. |

(Continued)

FOREIGN PATENT DOCUMENTS

| EP | 0325429 B1 | 10/1994 |
| EP | 2982060 A1 | 2/2016 |

(Continued)

OTHER PUBLICATIONS fs.com Inc., "16 Channels DWDM Dual Fiber 60km End-to-End Transport Platform (Set of Two)", FS North America, webpage accessed Apr. 17, 2020 <https://www.fs.com/products/76086.html> (5 pages).

(Continued)

*Primary Examiner* — Hanh Phan
(74) *Attorney, Agent, or Firm* — Bereskin & Parr LLP/S.E.N.C.R.L., s.r.l.; T. Cameron Gale; Ahmed Elmallah

(57) ABSTRACT

An optical system includes a plurality of internal apertures, a plurality of external optical assemblies and a telescope assembly positioned between the plurality of internal apertures and the plurality of external optical assemblies. Each internal aperture is operable to receive a corresponding aperture-specific optical signal. Each external optical assembly corresponds to one of the internal apertures, and each external optical assembly is operable to direct the aperture-specific optical signal of the corresponding internal aperture in a corresponding external direction. The external direction for each external optical assembly is independently controllable and the telescope assembly defines a shared optical train arranged to direct the aperture-specific optical signals between each internal aperture and the corresponding external optical assembly.

17 Claims, 17 Drawing Sheets

Related U.S. Application Data

(60) Provisional application No. 62/981,170, filed on Feb. 25, 2020.

(51) Int. Cl.
  *H04B 10/40* (2013.01)
  *G03H 1/02* (2006.01)

(58) Field of Classification Search
  CPC ............ H04B 10/1127; H04B 10/1143; H04B 10/1149; H04B 10/40; H04B 10/114; H04B 10/503
  USPC ....... 398/118, 119, 127, 128, 129, 130, 131, 398/120, 121, 123, 124, 125, 126, 135, 398/136, 158, 159, 33, 38, 115, 122
  See application file for complete search history.

(56) References Cited

U.S. PATENT DOCUMENTS

| | | | |
|---|---|---|---|
| 5,390,040 A | 2/1995 | Mayeux | |
| 5,905,591 A * | 5/1999 | Duncan | G02B 27/143 359/399 |
| 6,462,846 B1 | 10/2002 | DeLong | |
| 7,119,954 B2 | 10/2006 | Safa | |
| 7,292,788 B2 | 11/2007 | Triebes et al. | |
| 7,433,120 B2 | 10/2008 | Cook | |
| 7,532,819 B1 | 5/2009 | Triebes et al. | |
| 7,668,468 B1 | 2/2010 | Lewis et al. | |
| 8,953,946 B2 | 2/2015 | Coleman et al. | |
| 9,166,686 B2 | 10/2015 | Cook | |
| 9,673,901 B2 | 6/2017 | Chaffee et al. | |
| 9,680,565 B2 | 6/2017 | Miniscalco et al. | |
| 9,690,071 B2 | 6/2017 | Trail et al. | |
| 10,128,949 B2 | 11/2018 | Boroson et al. | |
| 10,404,403 B2 | 9/2019 | Troeltzsch et al. | |
| 2004/0085630 A1 | 5/2004 | Grassi et al. | |
| 2006/0024061 A1* | 2/2006 | Wirth | H04B 10/1125 398/129 |
| 2007/0127926 A1 | 6/2007 | Marioni et al. | |
| 2014/0294399 A1 | 10/2014 | Makowski et al. | |
| 2016/0112124 A1* | 4/2016 | Juarez | H04B 10/112 398/118 |
| 2016/0204866 A1 | 7/2016 | Boroson et al. | |
| 2018/0278335 A1 | 9/2018 | Segura et al. | |
| 2018/0321362 A1 | 11/2018 | Spuler | |
| 2019/0179130 A1 | 6/2019 | Miller et al. | |
| 2019/0238226 A1 | 8/2019 | Sperandel et al. | |
| 2019/0393956 A1 | 12/2019 | Kolev et al. | |
| 2021/0263293 A1* | 8/2021 | Ducellier | G02B 17/0631 |

FOREIGN PATENT DOCUMENTS

| | | |
|---|---|---|
| EP | 3672110 A1 | 6/2020 |
| WO | 2018/170037 A1 | 9/2008 |

OTHER PUBLICATIONS

Hemmati et al., "A Combined Laser-Communication and Imager for Microspacecraft (ACLAIM)", SPIE Laser Communications Meeting, Jan. 26, 1998 (7 pages).

L3 Technologies Inc., "Shared Aperture", L3HARRIS, SONOMA EO, 2019 <https://www2.l3t.com/sonomaeo/emerging_technology/shared_aperture.htm> (1 page).

He, "Optical System Architecture Design of Multiple Apertures Array Antenna for Satellite-to-ground Optical Communication", 2011 International Conference on Space Optical Systems and Applications (ICSOS), May 11-13, 2011, Santa Monica, California, IEEE, pp. 343-345.

Jiang, "Aperture Selection for ACO-OFDM in Free-Space Optical Turbulence Channel", IEEE Transactions on Vehicular Technology, Aug. 21, 2015 / Aug. 2016, 46(8): 6089-6100.

Carrasco-Casado et al., "LEO-to-ground optical communications using SOTA (Small Optical TrAnsponder)—Payload verification results and experiments on space quantum communications", Acta Astronautica, Oct. 2017, 139: 377-384.

Kaushal et al., "Optical Communication in Space: Challenges and Mitigation Techniques", IEEE Communications Surveys & Tutorials, 2016/2017, 19(1): 57-96.

Kingsbury et al., "Design of a Free-Space Optical Communication Module for Small Satellites", 28th Annual AIAA/USU Conference on Small Satellites, 2014, pp. 1-10.

Haddad et al., "Free Space Optics—Transportable Test Platform", summary of conference paper, NASA Technical Reports Server, Sep. 30, 2019 (13 pages).

Ribot Thunnissen, "Beam steering with spatial light modulators: Quantisation effects", Universitat de Barcelona, Jun. 2014, pp. 1-4.

Shi et al., "Experimental analysis of beam aiming and pointing system with phased only spatial light modulators", Third International Symposium on Laser Interaction with Matter (LIMIS 2014), Jiangsu, China, Proceedings of the SPIE, May 4, 2015, 9543: 95431W-1 to -6.

Hamamatsu Photonics K.K., "LCOS-SLM (Liquid Crystal on Silicon—Spatial Light Modulator)—X15213 series", brochure, Jul. 2020, pp. 1-12.

Extended European Search Report dated Jul. 16, 2021 in EP Patent Application No. 21156149.3 (7 pages).

Extended European Search Report dated Jan. 26, 2022 in EP Patent Application No. 21192475.8 (8 pages).

Non-Final Office Action and Notice of References Cited dated Dec. 9, 2021 in U.S. Appl. No. 16/881,338 (19 pages).

* cited by examiner

400

400

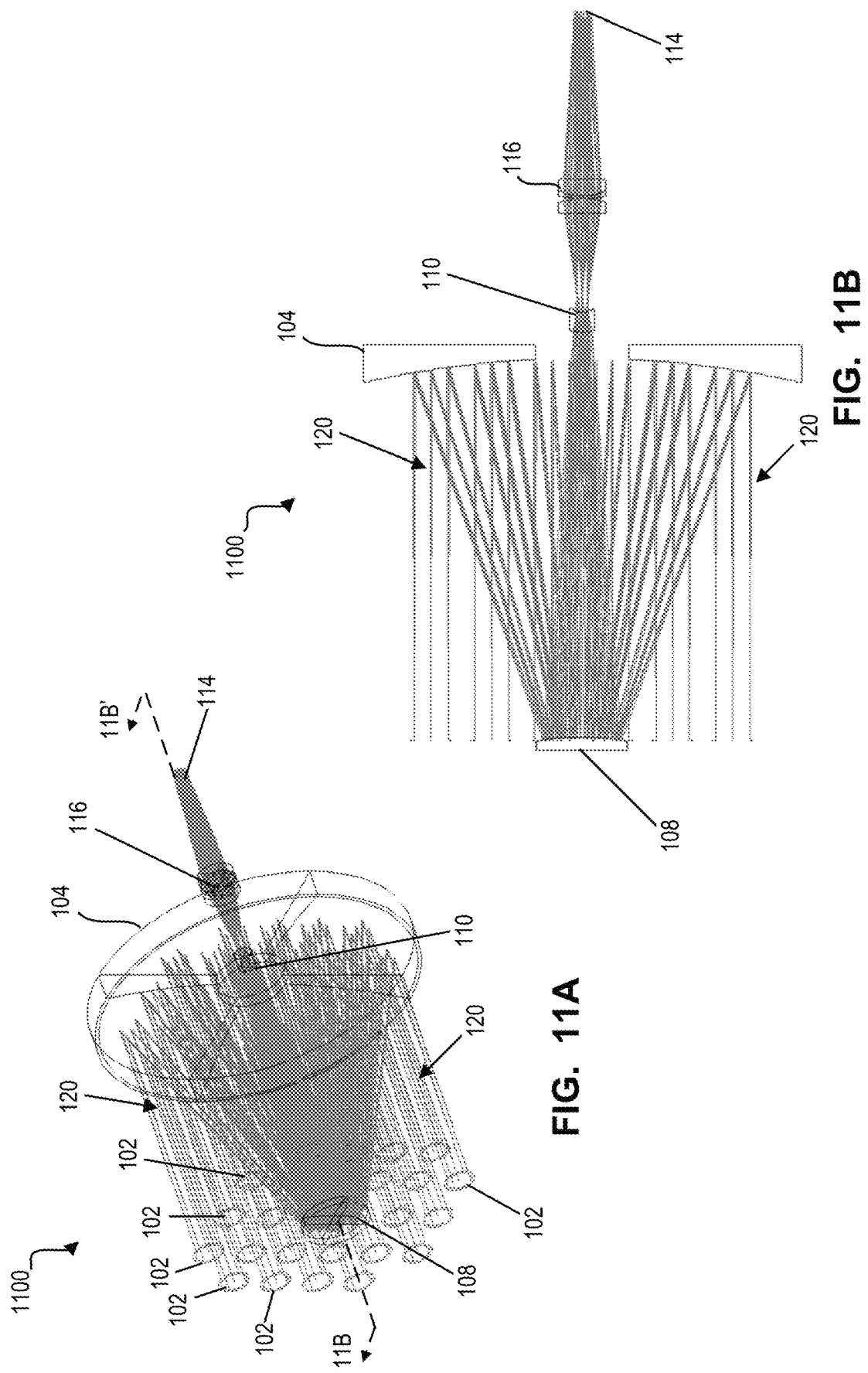

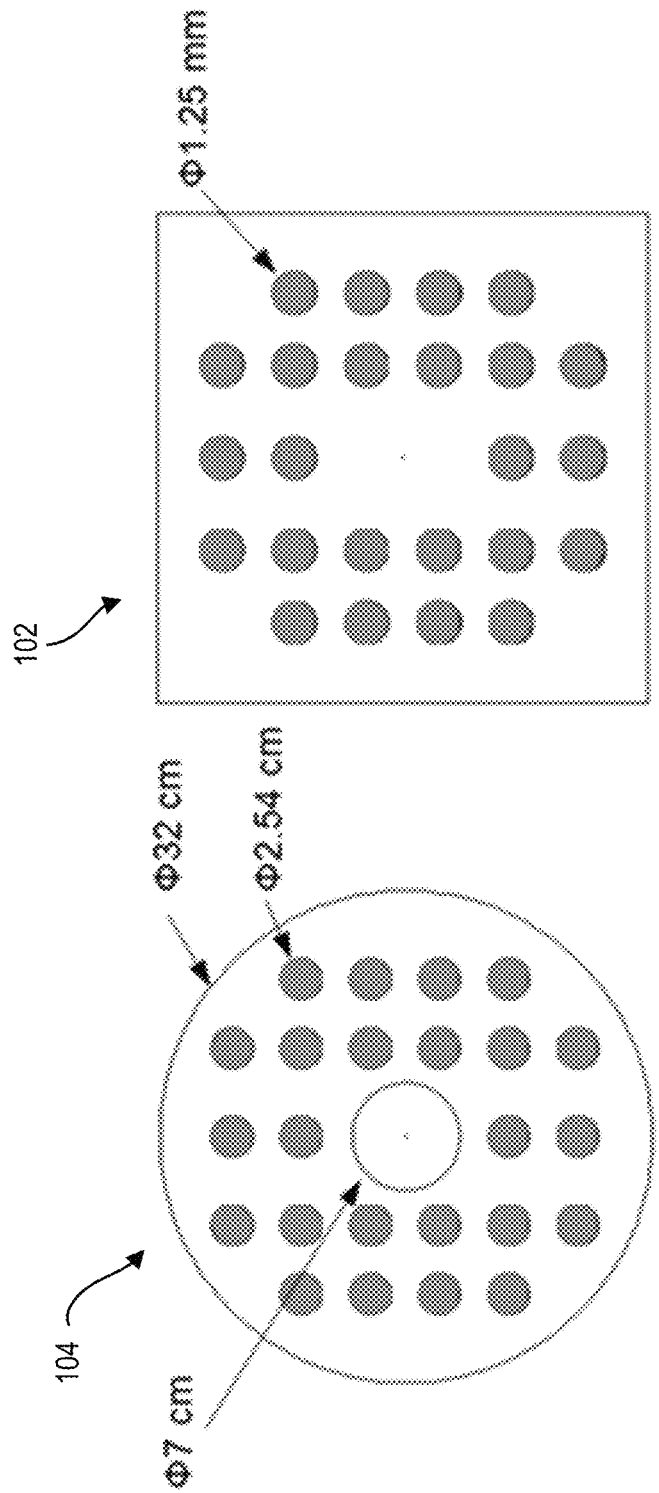

OPTICAL APPARATUS

CROSS-REFERENCE TO RELATED APPLICATIONS

This application is a continuation-in-part (CIP) of U.S. application Ser. No. 16/881,338 filed on May 22, 2020, which itself claims the benefit of U.S. Provisional Application No. 62/981,170 filed on Feb. 25, 2020, which is incorporated by reference herein in its entirety.

FIELD

The present subject-matter relates to optical systems, and more particularly to optical systems that include telescope assemblies.

INTRODUCTION

The following is not an admission that anything discussed below is part of the prior art or part of the common general knowledge of a person skilled in the art.

Satellite based telecommunication is increasingly being used to provide broadband communication across the globe. Telecommunication satellites can rapidly transmit data between locations on opposite sides of the globe, including locations on land, at sea and in the air. A number of satellite constellations are being launched in low earth orbit (e.g. One Web, Telesat LEO, Space X's Starlink, Amazon's Kuiper, etc.) to facilitate the transmission of data across the globe. There is an ongoing need to improve the communication capabilities of satellites used in telecommunication.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided an optical system that includes a plurality of internal apertures, wherein each internal aperture is operable to receive a corresponding aperture-specific optical signal; a plurality of coarse pointing optical assemblies, each of the plurality of coarse pointing assemblies receiving one or more corresponding aperture-specific optical signals, each coarse pointing optical assembly being independently controllable to deflect the received one or more corresponding aperture-specific optical signals in a corresponding signal-specific direction; a telescope assembly positioned intermediate the plurality of internal apertures and the plurality of coarse pointing optical assemblies, the telescope assembly defining a shared optical train arranged to direct aperture-specific optical signals between corresponding internal apertures and coarse pointing assemblies; and a plurality of aperture-specific fine pointing optical assemblies, each of the plurality of fine pointing assemblies being sized to fit within a corresponding internal aperture, wherein each of the fine pointing assemblies is operable to receive a corresponding aperture-specific optical signal having a respective signal-specific propagation direction, and each of the fine pointing assemblies is independently controllable to deflect the corresponding aperture-specific optical signal within a deflection range, the deflection range including the corresponding signal-specific propagation direction.

In some embodiments, each of the plurality of aperture-specific fine pointing assemblies comprise transmissive optical deflector assemblies.

In some embodiments, at least a subset of the plurality of aperture-specific fine pointing assemblies comprise piezo actuated fiber collimators.

In some embodiments, at least a subset of the plurality of aperture-specific fine pointing assemblies comprise a spatial light modulator (SLM).

In some embodiments, the SLM comprises one of a reflective SLM and a transmissive SLM.

In some embodiments, a subset of the plurality of coarse pointing optical assemblies comprise transmissive optical deflectors.

In some embodiments, the subset of the plurality of coarse pointing assemblies comprise Risley prism pair optical deflectors.

In some embodiments, the subset of the plurality of coarse pointing assemblies comprise at least one of acousto-optic deflectors or electro-optic deflectors.

In some embodiments, one or more of the plurality of coarse pointing assemblies comprise reflective optical deflectors.

In some embodiments, the reflective optical deflectors comprise at least one of gimbal mounted optical mirrors and coelostats.

In some embodiments, the plurality of coarse pointing assemblies are arranged in an assembly array, and the reflective optical deflectors are positioned proximate an outer edge of the array so as to avoid obstructing neighboring optical signal paths.

In some embodiments, the optical system is an optical laser communication system.

In some embodiments, each of the plurality of internal apertures is of substantially equal size.

In some embodiments, at least one of the plurality of internal apertures is of different size than the remaining internal apertures of the plurality of internal apertures.

In some embodiments, an external direction extends from the plurality of internal apertures towards the plurality of coarse pointing assemblies, and each of at least a subset of the plurality of coarse pointing assemblies is designated to deflect corresponding aperture-specific optical signals, propagating along the external direction, in a different corresponding aperture-specific deflection range.

In some embodiments, the optical system further includes a controller coupled to each of the plurality of coarse pointing assemblies and the plurality of fine pointing assemblies, the controller being operable to control a deflection direction of each of the plurality of coarse pointing assemblies and the plurality of fine pointing assemblies.

In some embodiments, an external direction extends from the plurality of internal apertures towards the plurality of coarse pointing assemblies, and the controller is configured to control at least one of the plurality of coarse pointing assemblies to re-direct an external propagation direction of a corresponding aperture-specific optical signal, propagating along the external direction, to accommodate for a defective communication link.

It will be appreciated by a person skilled in the art that an optical system may include any one or more of the features contained herein and that the features may be used in any particular combination or sub-combination suitable for an optical system.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 11A shows a perspective view of an example telescope assembly in accordance with another embodiment;

FIG. 11B shows a cross-sectional view of the example telescope assembly of FIG. 11A, taken along the cross-sectional line 11B-11B' of FIG. 11A;

FIG. 11C shows an example sub-beam footprint on a mirror of the example telescope assembly of FIG. 11A;

FIG. 11D shows an example sub-beam footprint on a beam deflector array of the example telescope assembly of FIG. 11A;

DESCRIPTION OF VARIOUS EMBODIMENTS

Figure 1A:
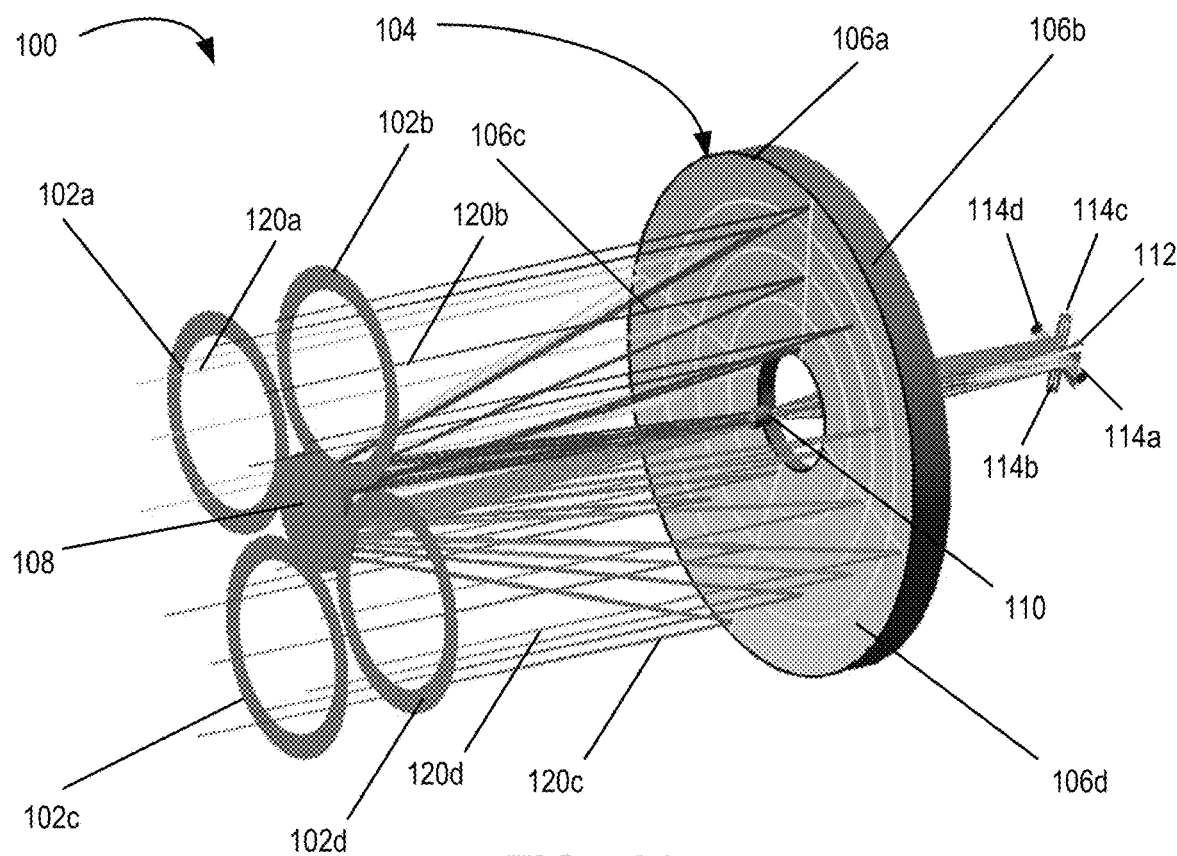
FIG. 1A shows a perspective view of an example telescope assembly in accordance with an embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

In the description and drawings herein, reference may be made to a Cartesian co-ordinate system in which the vertical direction, or z-axis, extends in an up and down orientation from bottom to top. The x-axis extends in a first horizontal or width dimension perpendicular to the z-axis, and the y-axis extends cross-wise horizontally relative to the x-axis in a second horizontal or length dimension.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Satellite based telecommunications systems can provide point-to-point communication coverage across the planet. Satellite communication links are being developed based on optical communication technologies rather than radio-frequency communications. The use of optical communication technologies provides orders of magnitude larger communication bandwidth as compared to RF communications and avoids difficulties associated with spectrum licensing. Optical communications are also very precise and do not diffract as much as communications using radio-frequency spectrum. To ensure that the communications are directed appropriately, the satellite optics (e.g. the telescope assembly within each satellite) need to be precisely manufactured and aligned. In addition, stabilization techniques may also be required to minimize or avoid jitter caused by the motion of the satellite.

Constellations of telecommunication satellites promise ubiquitous, high bandwidth and low-latency broadband coverage everywhere on the planet, in the air or at sea. These satellite constellations may include many hundreds of satellites in orbit around the Earth (in low-earth orbit). The satellites in each satellite constellation can be inter-connected through communication links to provide linked communication networks in the sky (e.g. in low-earth orbit). These inter-linked satellite communication networks may enable global communication coverage from any point on the planet (land, sea or air) to any other point on the planet by transmitting data across multiple satellites.

To provide desired throughput levels (e.g. throughput in excess of 10 Gb/s), satellites may include laser-based communication systems. To fully realize the potential of satellite communication networks, inter-satellite-links between each satellite and neighboring satellites would be desirable. In a typical configuration, each satellite in a network may be linked to a plurality of neighboring satellites in different directions (e.g. connected to four neighboring satellites for instance by a forward link, a bottom link, a left side link, and a right side link).

To provide the inter-satellite links, each satellite can be provided with multiple (e.g. four) optical signal terminals (that can be used for signal transmission/acquisition) also referred to herein as communication terminals. The terminals may be positioned at the corners of the satellite or in the middle. For each communication terminal, the satellite can include a telescope assembly to connect the external optics (e.g. the signal output/signal input optics) to internal communication systems. The signals from the telescope assembly can be aimed towards a neighboring satellite using a beam deflector (e.g. a coarse pointing assembly) provided by the corresponding communication terminal.

However, manufacturing four separate communication terminals, each having a separate high precision optical telescope, separate support structures, and separate mounting is expensive and requires high levels of manufacturing precision and testing. In addition, providing four separate telescope assemblies (along with the associated housing and mounting structures) is size and mass intensive, particularly for satellite applications.

Embodiments described herein may provide an optical system that includes a plurality of communication terminals. Each communication terminal can be independently controllable so that the terminals can be pointed in different directions (e.g. to target different neighboring satellites). Each communication terminal can be coupled to an internal aperture through a corresponding communication path.

However, rather than providing a separate telescope assembly for each terminal (and each communication path), the communication system can include a combined telescope assembly for all of the communication terminals (and communication paths). This telescope assembly can define a shared optical train that is used for each of the communication terminals/communication paths.

The shared telescope assembly may help reduce the size and mass requirements for the set of communication paths. In addition, the shared optical train may enable a simplified and less costly manufacturing and testing process.

Referring now to FIG. 1A, shown therein is an example telescope assembly 100 in accordance with an embodiment. Telescope assembly 100 may be used in various optical systems, such as an optical communication system or an optical imaging system. Telescope assembly 100 may provide a shared optical train for a plurality of signal paths.

For example, telescope assembly 100 may be used in an optical communication system such as an optical laser communication system used in a satellite. The telescope assembly 100 may provide an optical laser communication system with a shared optical train for a plurality of communication signal paths (e.g. for a plurality of communication links to neighboring satellites). In the example of FIG. 1A, each communication path may be represented by the corresponding communication path signal 120*a*-120*d*.

Each communication path can be coupled to a corresponding external communication terminal. Each external communication terminal may be operable to point in different directions (e.g. along different axes) while using the same shared optical train to transmit optical signals within the laser communication system. This may help reduce the size and mass of the optical communication system while permitting communication with multiple other systems arranged in different locations. This may be particularly advantageous in satellite applications, to facilitate inter-satellite-links while reducing the optical communication payload for each satellite.

Figure 16:
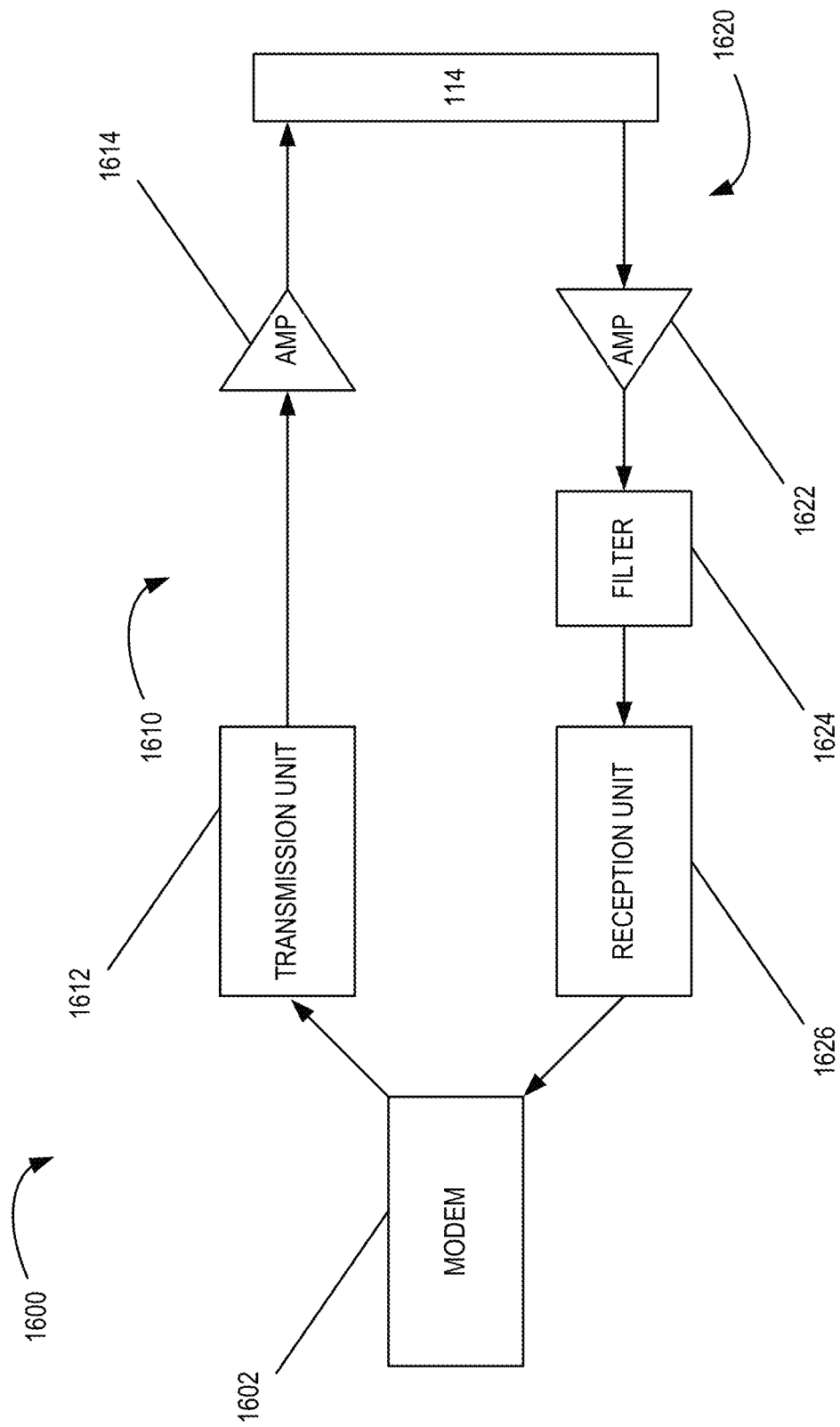
FIG. 16 shows a block diagram of an example signal transceiver unit in accordance with an embodiment.

As shown in FIG. 1A, the telescope assembly 100 can be coupled to a plurality of internal apertures 114*a*-114*d*. The internal apertures 114*a*-114*d* may be coupled to internal processing and/or control components. For example, the internal apertures 114*a*-114*d* may be coupled to internal communications components of a communication system, e.g. through fiber-optic links. An example of communication components that may be coupled to the internal apertures 114*a*-114*d* is shown in FIG. 16 and described herein below.

Each internal aperture 114 can be configured to communicate (e.g. receive or transmit) a corresponding aperture-specific optical signal 120*a*-120*d*. The aperture-specific optical signal 120 can be the optical signal received through, or to be transmitted through, a corresponding communication terminal. The direction of each corresponding communication terminal may be independently controllable. This may allow the optical signals from the internal apertures 114 to be communicated in (e.g. transmitted to or received from) different directions.

In the example illustrated, the telescope assembly is coupled to four internal apertures 114*a*-114*d*, although a different number of internal apertures may be provided in other embodiments of an optical system. The number of internal apertures 114 may be defined to correspond to the number of external communication terminals desired for an optical communication system.

System 100 can also include a plurality of external optical assemblies. The external optical assemblies can be configured to transmit and/or receive signals from external locations and/or systems. For example, the external optical assemblies may be configured to communicate with external communication systems such as other satellites. Alternately or in addition, the external optical assemblies may be configured to acquire signals from specified locations (e.g. images of specific locations). The external optical assemblies may include the external communication terminals as well as the optical components used to direct signals through those external terminals.

Figure 10:
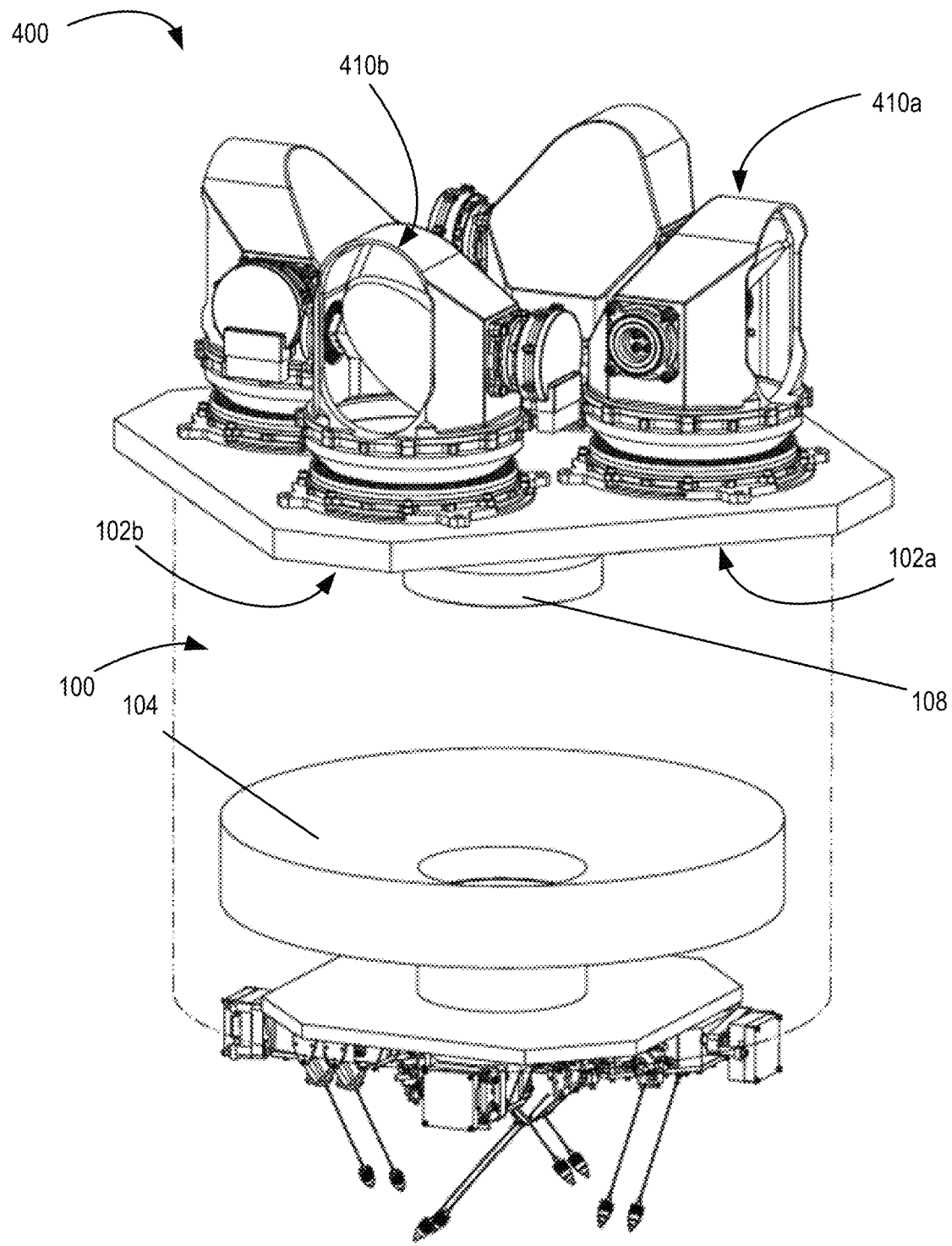
FIG. 10 shows a side view of the example optical signal transmission system of FIG. 6 with a transparent housing section in accordance with an embodiment.

In FIG. 1A, representative external apertures 102*a*-102*d* are illustrated to indicate an example of the position of each aperture coupling to each external optical assembly. That is, each representative aperture 102a-102d provides an indication of where the telescope assembly 100 can be connected to a corresponding external optical assembly. Each representative aperture 102a-102d may correspond to an optical head unit of the corresponding external optical assembly (see e.g. FIG. 10 for example).

Each external optical assembly may correspond to a particular one of the internal apertures 114a-114d. Communication paths represented by signals 120a-120d shown in FIG. 1 are an example of a plurality of communication paths between internal apertures 114a-114d and corresponding external optical assemblies (represented by apertures 102a-102d). As shown in FIG. 1, the telescope assembly 100 includes four communication paths 120a-120d corresponding to four external communication terminals, although other numbers of communication paths may be used in different implementations. In some cases, multiple signals (e.g. one or more transmitted and/or received signals) may be communicated concurrently (e.g. through the use of various signal modulation techniques) through an individual communication path 120.

Each external optical assembly may be configured to direct the aperture-specific optical signals from the corresponding internal aperture 114 in a corresponding external direction. Each external optical assembly may be configured to transmit outgoing aperture-specific optical signals from a corresponding internal aperture 114 through an external communication terminal along the corresponding external direction. The external optical assembly and telescope assembly 100 can be configured to direct the outgoing aperture-specific optical signals received from the corresponding internal aperture 114 to be output in the corresponding external direction.

Each external optical assembly may also be configured to receive incoming aperture-specific optical signals through the external communication link from the corresponding external direction. The external optical assembly and telescope assembly 100 can be configured to direct the incoming aperture-specific optical signals received from the corresponding external direction to the corresponding internal aperture 114.

The telescope assembly 100 can be configured to direct aperture-specific optical signals between each internal aperture 114 and the corresponding external optical assembly (e.g. apertures 102). The telescope assembly can define a shared optical train for the plurality of internal-apertures 114a-114d.

The external direction for each external optical assembly may be independently controllable. This may allow the internal apertures 114a-114d to communicate with signals in different directions. The external optical assembly corresponding to each internal aperture 114 may be configured to communicate in an external direction that is spaced apart from every other external direction by a defined angular separation.

For example, the telescope assembly 100 may define a telescope field of view. Each external direction may be adjustable to an angular separation from each and every other external direction that is greater than the telescope field of view. This may allow the communication system (and associated satellite) to communicate with multiple different neighboring systems. Each external direction may be adjustable through a range of angular directions. The external directions may be adjusted to target different communication systems (e.g. neighboring satellites) and/or locations of interest (e.g. imaging locations). The range of angular directions for each communication terminal may vary in different embodiments.

Figure 1B:
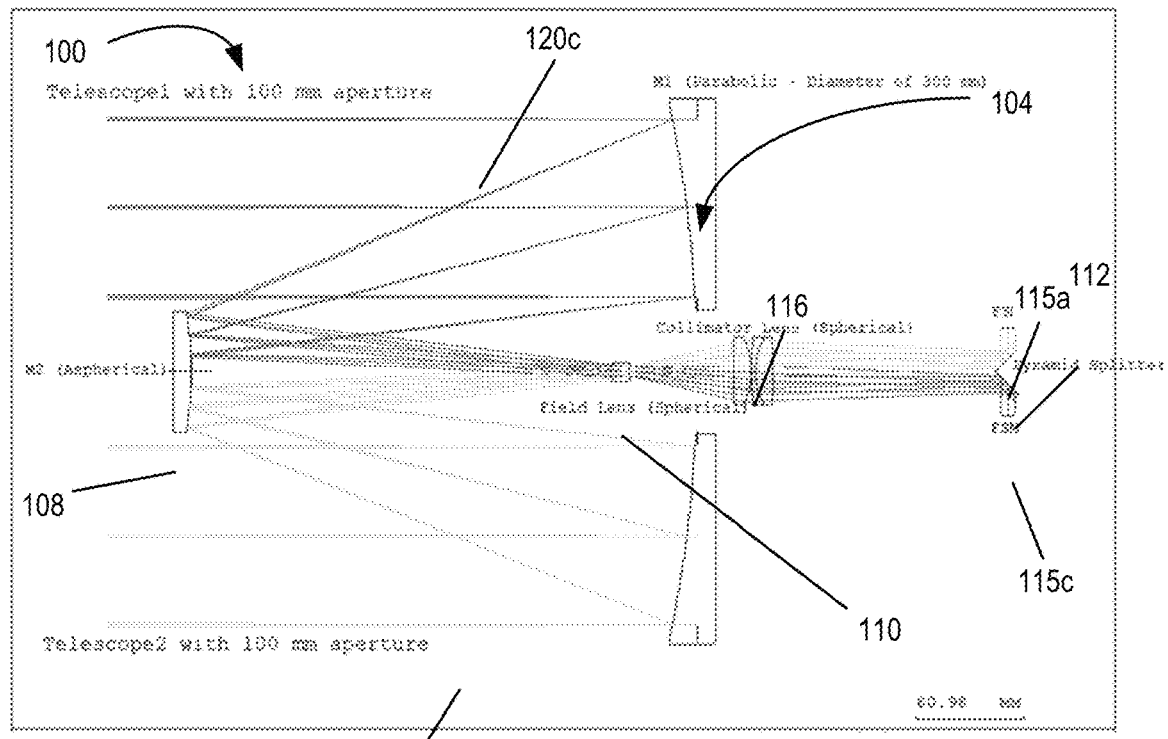
FIG. 1B shows a sectional view of the example telescope assembly of FIG. 1A in accordance with an embodiment.

The telescope assembly 100 can be positioned between the plurality of internal apertures 114 and the corresponding external optical assemblies (as shown by sub-apertures 102). The telescope assembly can include an optical train (i.e. a sequence of optical components) usable to direct optical communication signals between each input aperture 114 and the corresponding external optical assembly (as shown by sub-apertures 102). As shown in FIGS. 1A and 1B, the telescope assembly 100 can define a shared optical train for all of the communication paths 120a-120d.

The telescope assembly can be configured as a reflecting telescope including a plurality of mirrors. In some examples, the telescope assembly may be configured as an afocal telescope as shown.

As shown in FIGS. 1A and 1B, the optical train can include a first mirror 104, a second mirror 108, a series of lenses 110 and 116, a beam splitter 112 and an internal coupling component 115 (shown as a fast steering mirror in the example of FIG. 1B). Alternately, different configurations of the optical train may be implemented using only mirrors (see e.g. FIGS. 2 and 4) or using only lenses, or various other combinations of at least one lens and at least one mirror.

Each external optical assembly can include an input sub-aperture 102 (e.g. an optical head unit) arranged facing the first mirror 104. As shown in FIG. 1A, the first mirror 104 can be a parabolic mirror. Each input sub-aperture 102a-102d can be arranged to direct the corresponding incoming aperture specific optical signal to the same parabolic mirror 104 (or receive the corresponding outgoing aperture specific optical signal from that same parabolic mirror 104).

The optical train can also include a second mirror 108. As shown in FIG. 1B, the second mirror 108 may be an aspherical mirror. The second mirror 108 can be positioned to direct optical signals between the first mirror 104 and the lens sequence 110/116. The use of lens sequence 110/116 in place of a third mirror may further reduce the size of the telescope assembly 100.

The lens sequence 110/116 can include a spherical field lens 110 and a beam collimator lens 116. Each lens 110/116 may be provided as a spherical lens as shown in the example of FIG. 1B.

The beam splitter 112 can be positioned between the lens sequence 110/116 and the plurality of internal apertures 114a-114d. The beam splitter 112 can direct the corresponding optical signals to/from the corresponding input apertures 114. As shown in the example of FIGS. 1A and 1B, respective fast steering mirror 115 can be provided to further direct the optical signals towards the respective input apertures 114.

Various types of beam splitters 112 may be used. For example, a pyramid splitter, such as a metallized pyramidal prism, may be used as the beam splitter as shown in the example of FIG. 1B. Alternately, mirror-based beam splitters may be used.

The plurality of optical components in the shared optical train can be arranged about a central telescope axis. Each of the optical components (e.g. first mirror 104, second mirror 108, and lenses 110 and 116 in the example of FIGS. 1A and 1B) in the shared optical train can be positioned concentrically with the central telescope axis. The optical components can also be rotationally symmetric (e.g. about the central telescope axis). This may simplify the process of manufacturing the optical components of system 100.

By providing a shared optical train for each aperture-specific optical signal 120a-120d, the overall size and mass of the optical components required by the system 100 can be reduced. While the optical components in system 100 may be larger than those required for an optical train for one individual aperture-specific optical signal 120a-120d, the total size of system 100 can be significantly less than the combined size and mass of multiple individual optical trains.

In addition to reducing the size of the optical components, providing a shared optical train may also reduce the size and mass of other components, such as housings, support structures, heating/cooling elements, control signal lines and so forth required for the optical system. For example, the optical system may be provided within a combined housing as shown in the example of FIGS. 6-10 described herein below. This may allow the communication terminals to share housing and support structures, and share heating/cooling elements. Sharing of the heating/cooling elements may also reduce the power consumption required by the communication system, by heating one housing rather than four separate housings.

The control components of the communication system may similarly be simplified. In addition, the distance over which control cables need to be routed can be reduced, which may provide particular advantages for applications such as satellites.

Providing an optical system for a plurality of communication terminals that includes a shared optical train can also simplify the manufacturing and testing process, and reduce manufacturing costs. Overall costs can be reduced by required only one set of high precision optics that is shared by the plurality of communication terminals. In addition, a single support structure and a single temperature and mechanical isolation assembly can be shared by each of the communication terminals. The reduced part count both reduces costs (by reducing the number of high precision optical elements required) and helps facilitate high volume manufacturing. Rather than having to separately manufacture and align multiple telescope assemblies, a combined telescope assembly can be manufactured and aligned thereby providing multiple aligned telescope sections (see e.g. FIG. 3).

Figure 3:
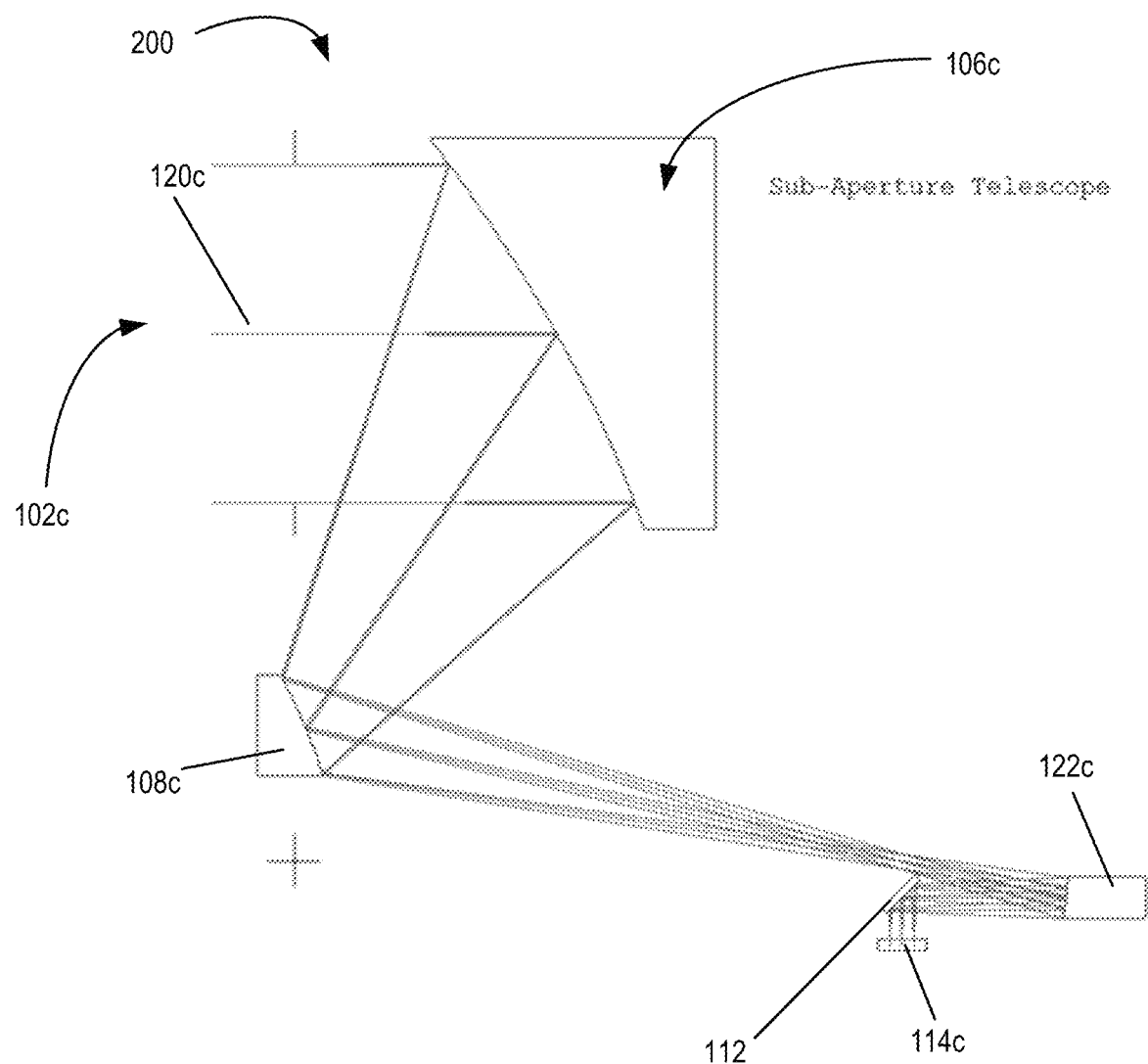
FIG. 3 shows a sectional view of an individual telescope portion of the example telescope assembly of FIG. 2 in accordance with an embodiment.

In some examples, the mirrors used in the optical train, such as the first mirror 104, may be manufacturing using a single point diamond turning (SPDT) process. SPDT is a common manufacturing method for metallic mirrors. SPDT provides greater fidelity to a desired surface form when the mirror being manufactured is a rotationally symmetric, on-axis mirror. Thus, manufacturing a single, rotationally symmetric, on-axis mirror 104 that is shared by multiple communication paths (in place of multiple off-axis mirrors) can provide more cost effective and higher performance manufacturing of the optical train as compared to individually machining multiple sets of optical components. In addition, as each individual telescope section can be configured as off-axis telescopes, central obstruction can be avoided by using multiple mirror sections 106a-106d off-axis (e.g. corresponding to input apertures 102a-102d). Thus, each communication path may in effect use an off-axis telescope assembly section 200 of the telescope assembly 100 as shown in FIG. 3 and described herein below.

Similar techniques can also be used to manufacture the other mirror components of the optical train, e.g. using SPDT.

Furthermore, testing and validation of the optical components can be simplified, as only many fewer components may require testing (e.g. ¼ of the number of optical components in a four terminal configuration).

Figure 2:
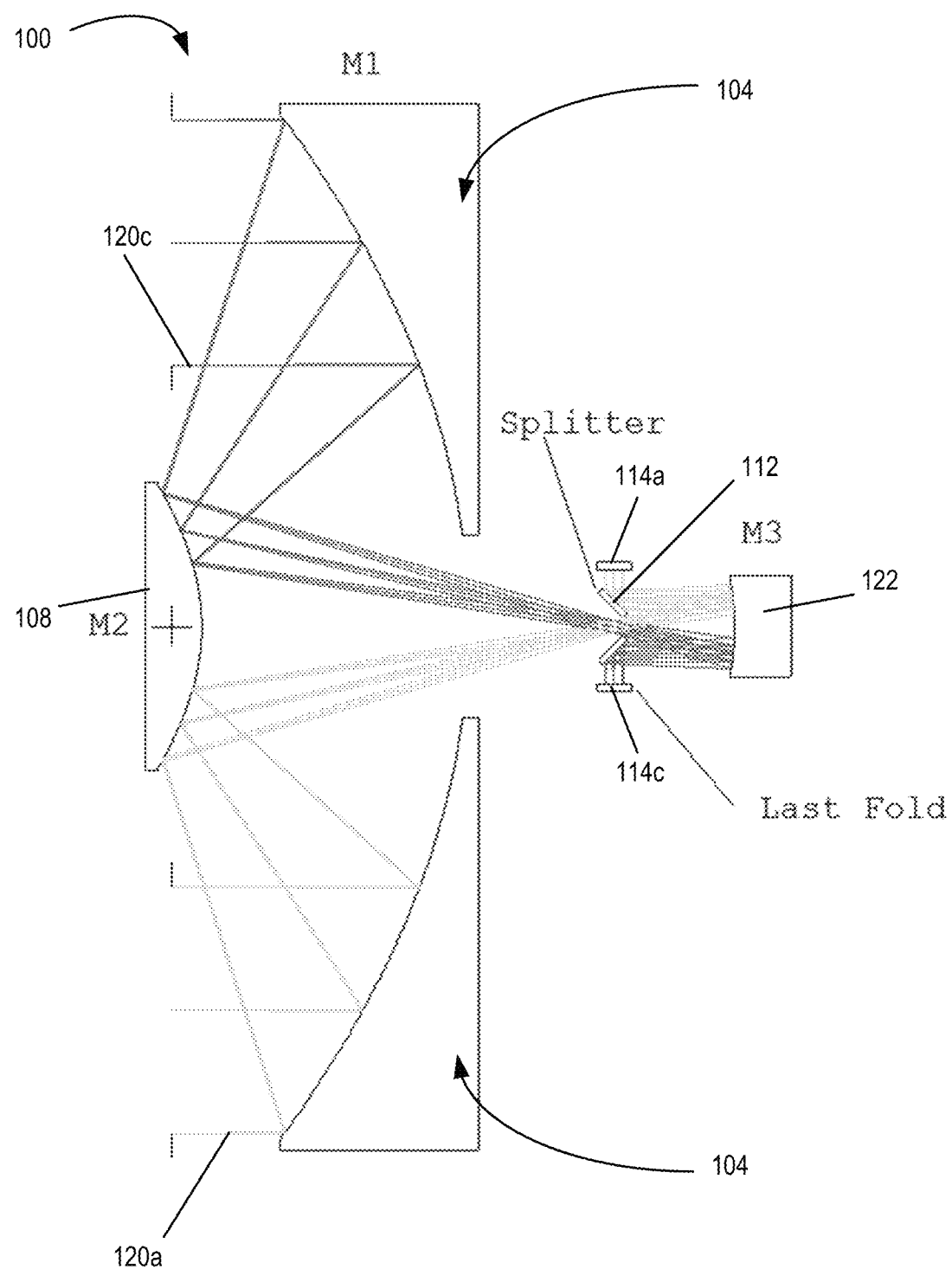
FIG. 2 shows a sectional view of another example telescope assembly in accordance with an embodiment.

Referring now to FIG. 2, shown therein is another example of a telescope assembly 100 that may be used in accordance with an embodiment. The telescope assembly 100 shown in FIG. 2 is generally similar to the assembly shown in FIG. 1B, except that the optical train is implemented entirely with mirrors. Thus, in place of the lenses 110 and 116, the telescope assembly 100 shown in FIG. 2 includes a third mirror 122. This may reduce chromatic aberrations for the optical communication system.

In addition, in contrast with the assembly shown in FIG. 1B, the splitter 112 is positioned between the third mirror 122 and the second mirror 108. The splitter 112 shown in FIG. 2 may be inverted as compared to the splitter 112 shown in the embodiment of FIGS. 1A and 1B. As with the splitter 112 shown in FIGS. 1A and 1B, various types of splitters may be used in the embodiment of FIG. 2. For example, fold mirrors may be used as the splitter 112 as shown in the example of FIG. 2.

As with the telescope assembly 100 shown in FIGS. 1A and 1B, the mirrors used in the telescope assembly 100 of FIG. 2 can be rotationally symmetric. Similarly, the mirrors used in the telescope assembly 100 of FIG. 2 can be concentric with each other.

As with the telescope assembly 100 shown in FIGS. 1A and 1B, the mirrors used in the telescope assembly of FIG. 2 may be machined using Single Point Diamond Turning.

Referring now to FIG. 3, shown therein is a telescope assembly section 200 of the telescope assembly 100 shown in FIG. 2. The telescope assembly section 200 shown in FIG. 3, illustrates an optical train section corresponding to a single input aperture 114c and corresponding external optical assembly (represented by input aperture 102c). Each input aperture 114 (and corresponding external optical assembly) in the telescope assembly 100 may have a corresponding optical train section such as the section 200 shown in FIG. 3.

As shown in FIG. 1A, a single on-axis mirror 104 can be shared for each external communication terminal (represented by apertures 102a-102d). As shown in FIG. 3, the optical train assembly can operate as separate telescope assembly sections 200 for each external optical assembly/internal aperture 114. While the overall telescope assembly 100 may be provided with an on-axis mirror 104, each telescope section 200 may in effect provide an off-axis mirror section 106a-106d for the corresponding optical train section.

As shown in FIG. 3, the optical train section of the telescope section 200 corresponding to the individual sub-aperture 102c can be generally analogous to an independent off-axis telescope assembly. In the example illustrated, the optical train section includes a first mirror section 106c (corresponding to a portion of first mirror 104), a second mirror section 108c (corresponding to a portion of second mirror 108), and a third mirror section 122c (corresponding to a portion of third mirror 122).

Each communication path (e.g. each signal path between an internal aperture 114 and corresponding aperture 102/external optical assembly) may have a corresponding optical train section that includes a specific portion of each optical train element (e.g. first mirror 104, second mirror 108, and third mirror 122) for that communication path. The portion of each optical train element for a given communication path may be separate from the portion of each optical train element for each and every other communication path using the shared optical train. Each communication path may nonetheless include the same sequence of optical train elements with the signals along those communication paths interacting with different segments or sections of the optical train elements. The different communication paths can be non-intersecting between each internal aperture 114 and corresponding aperture 102.

Alternate optical train section configurations may be provided depending on the configuration of the telescope assembly 100, e.g. using different combinations of mirrors and/or lenses. In different configurations of the telescope assembly 100, the plurality of communication paths may share optical train elements while interacting with different portions of each optical train element.

The optical train section can also include a splitter section 112 and the corresponding aperture 114c. The first mirror section 106c, second mirror section 108c, and third mirror section 122c can be configured to provide an afocal telescope assembly for the communication path 120c between internal aperture 114c and the corresponding external optical assembly.

In the example illustrated, the first mirror section 106c operates as an off-axis parabolic mirror section for the optical train section. In the telescope assembly section 200, the first mirror section 106c is provided by a sub-aperture of the on-axis mirror 104. Although the overall larger telescope assembly 100 may be rotationally symmetric and may correspond to an on-axis telescope, in operation it can be used as a set of off-axis telescopes (e.g. four off-axis telescopes) as shown in FIG. 3. Each off-axis telescope section can be coupled to a corresponding external optical assembly whose communication direction can be independently controlled. For instance, the external optical assembly corresponding to each off-axis telescope section can have an independent pointing range (e.g. an independent range for the corresponding external direction) that can be controlled, e.g. through a beam deflector arrangement. For example, each external optical assembly may include a coarse pointing assembly usable to adjust the external direction for that communication path.

Each communication path may also include a fine pointing assembly proximate the corresponding internal aperture. The fine pointing assembly may be provided as an internal jitter stabilization device operable to perform small adjustments of the communication path proximate the internal aperture 114. The movements performed by the fine pointing assembly may be defined to remain well within the telescope field of view of telescope assembly 100.

Figure 4:
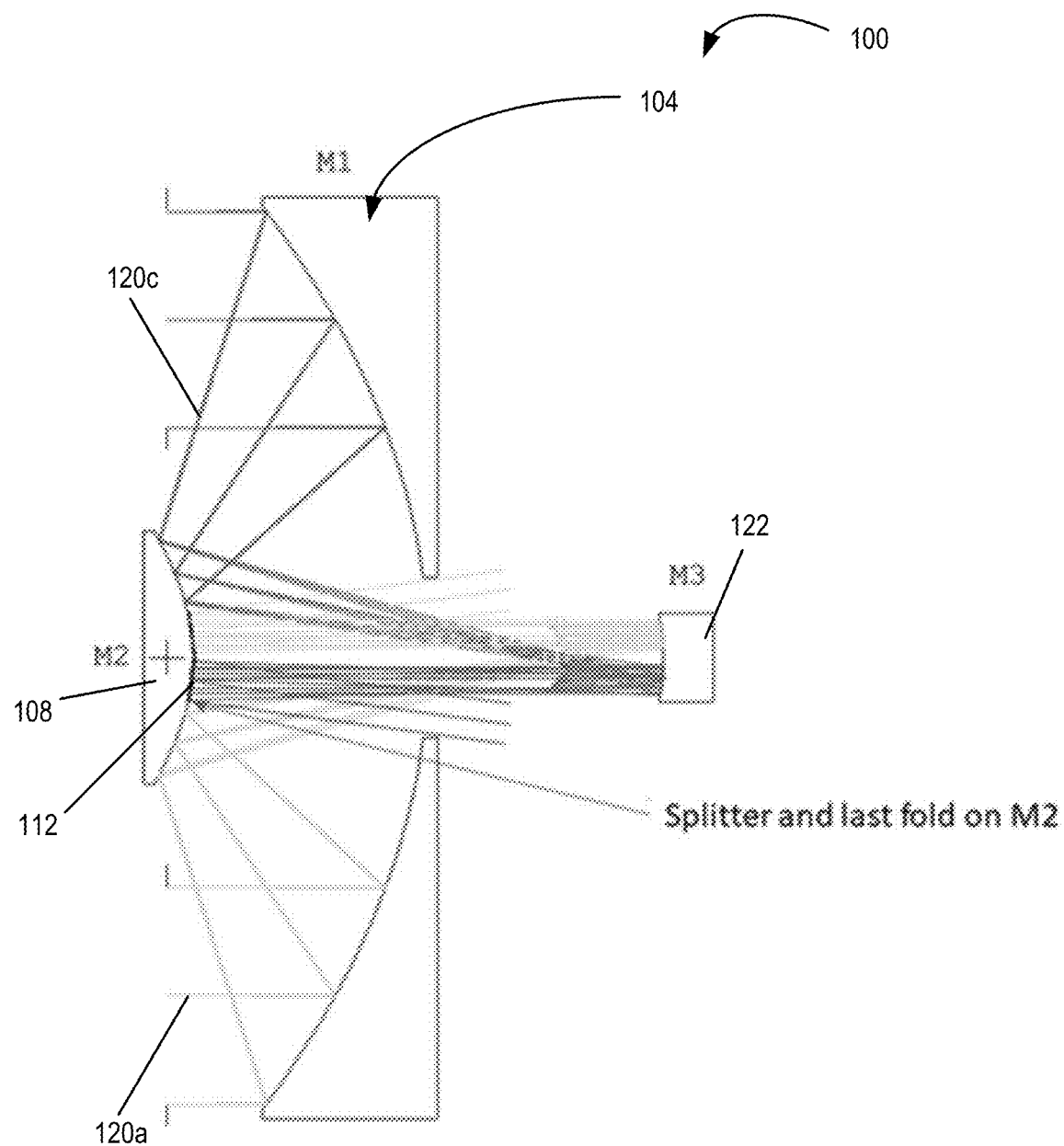
FIG. 4 shows a sectional view of another example telescope assembly in accordance with an embodiment.

Referring now to FIG. 4 shown therein is another example of a telescope assembly 100 that may be used in accordance with an embodiment. The telescope assembly 100 shown in FIG. 4 is generally similar to the assembly shown in FIG. 2, except that the splitter 112 is provided on the second mirror 108. The second mirror 108 may also include a final folding mirror usable to direct communications to/from the corresponding internal aperture. This may further reduce the number of components in the telescope assembly 100, and allow the telescope assembly 100 to be even more compact. For example, the splitter 112 can be incorporated into the second mirror 108 through the single-point diamond turning process.

Figure 5:
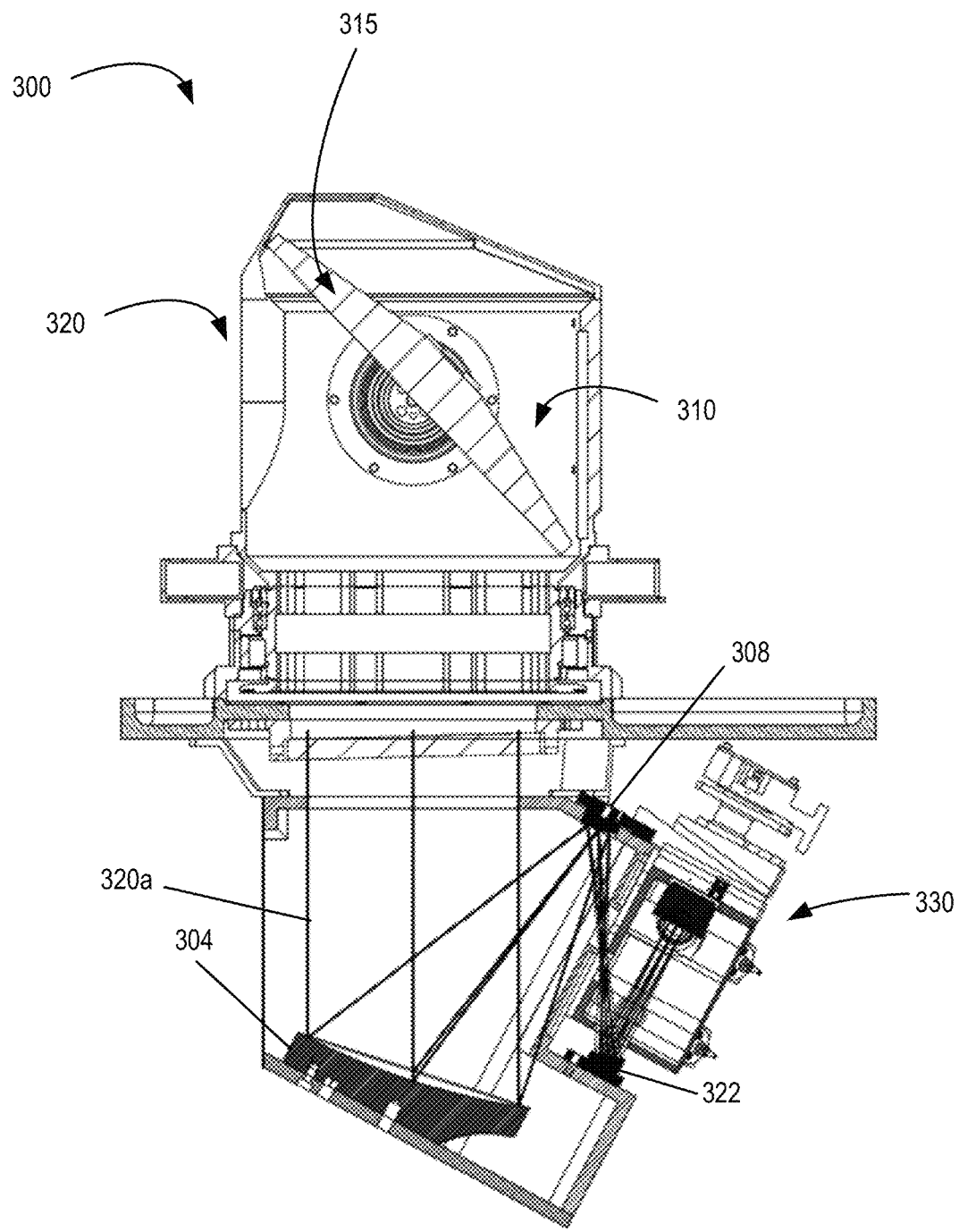
FIG. 5 shows a sectional view of an example signal transmission terminal assembly.

Referring now to FIG. 5, shown therein is an example of a terminal section 300 of an optical communication system. The terminal section illustrates the configuration of the portion of the optical communication system corresponding to an individual communication terminal. Terminal section 300 shown in FIG. 5 is an example of a single communication terminal in which the telescope assembly is specific to that terminal. However, the components of the terminal section 300 apart from the individual telescope assembly section may be used in accordance with embodiments described herein.

In the example illustrated, the terminal section 300 extends between an external communication opening (or aperture) 320 and internal couplings (not shown) connected to a fine pointing assembly 330. As shown, the terminal section 300 includes a coarse pointing assembly 310, a telescope assembly section (including first mirror 304, second mirror 308, and third mirror 322), and a fine pointing assembly 330. Optical signals 320a can be transmitted between the opening 320 and the input couplings via the coarse pointing assembly 310, telescope assembly, and fine pointing assembly 330.

Optical signals (e.g. laser light) can be directed via fiber couplers (not shown) into the fine pointing module 330. The optical signals can then be directed to the telescope assembly, where it can be magnified (e.g. by 13.3× in the illustrated example). The magnified optical signals can then be directed through the coarse pointing assembly 310. The magnified light can then contact the mirror 315 and exit the coarse pointing assembly 310 through opening 320.

The reverse process can be performed for incoming aperture-specific signals arriving at the opening 320 of each communication terminal. Optical signals (e.g. laser light) can be received through opening 320 and contact the mirror 315 where it is redirected through the coarse pointing assembly 310 to the telescope assembly. The optical signals can then be de-magnified and directed into the fine pointing module 330. The optical signals can then be coupled into control and/or processing systems, e.g. through fiber couplings.

In the example illustrated, the coarse pointing assembly 310 is an example of an external optical assembly that may be used with a communication system that includes telescope assembly 100. The coarse pointing assembly 310 can be actuated to control the external communication direction of the corresponding communication path.

Each communication path in a communication system including telescope assembly 100 can be configured to travel through an independently actuated coarse pointing assembly 310. More generally, in embodiments including telescope assembly 100, each communication path may be directed through an independently controllable beam deflector that is adjustable to define the external communication direction of the corresponding communication path.

Each communication path in a communication system including telescope assembly 100 can also include an independent fine pointing assembly 330. However, in contrast with the example shown in FIG. 5, each communication path 120 can share the same telescope assembly 100 and optical train. Accordingly, the components of each communication path 120a-120d may be contained within a single main housing and assembly (see e.g. FIGS. 6 to 10). This may also facilitate more rapid manufacturing and simpler alignment of the optical components.

Figure 6:
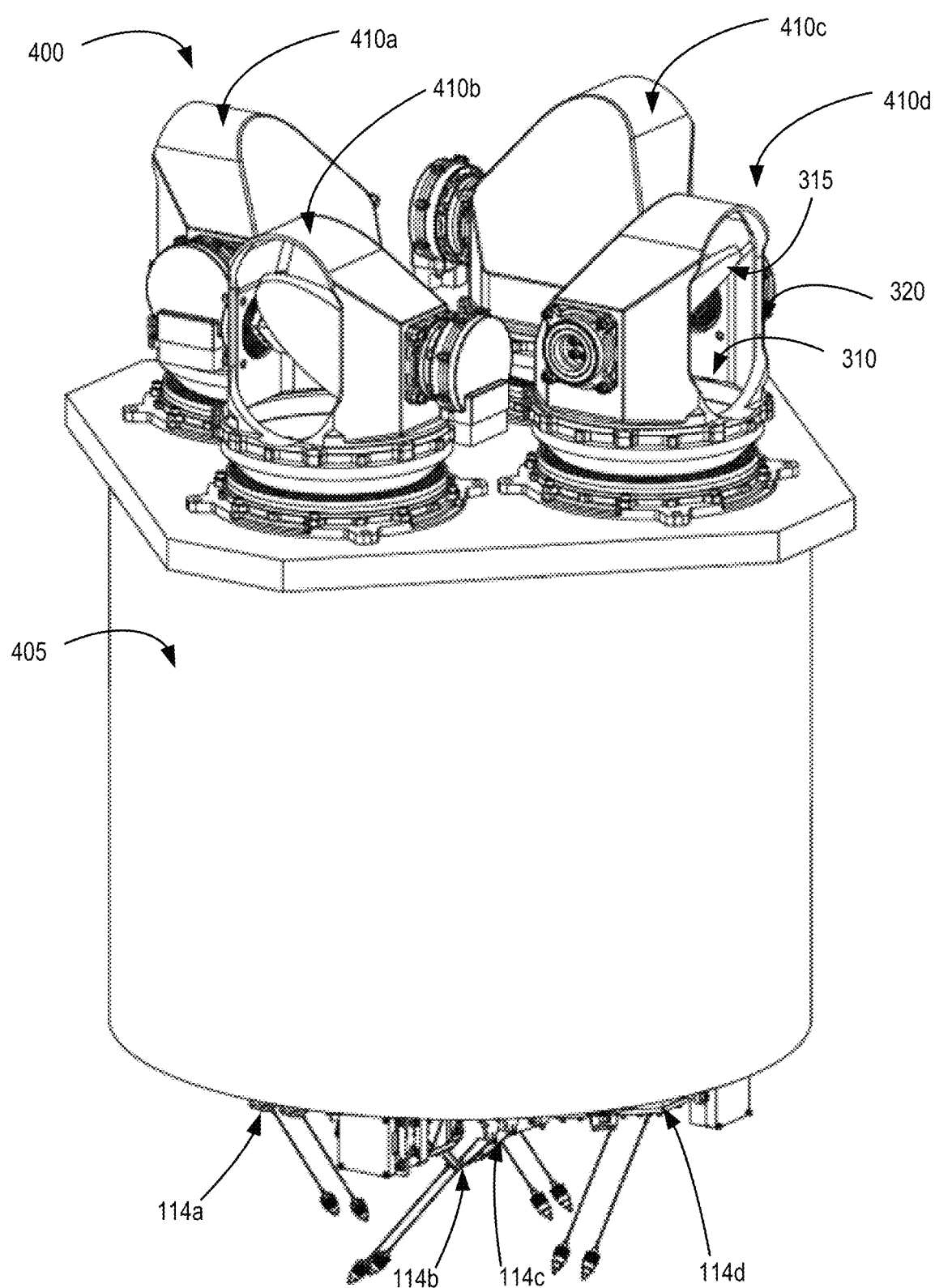
FIG. 6 shows a perspective view of an example optical signal transmission system in accordance with an embodiment.
Figure 7:
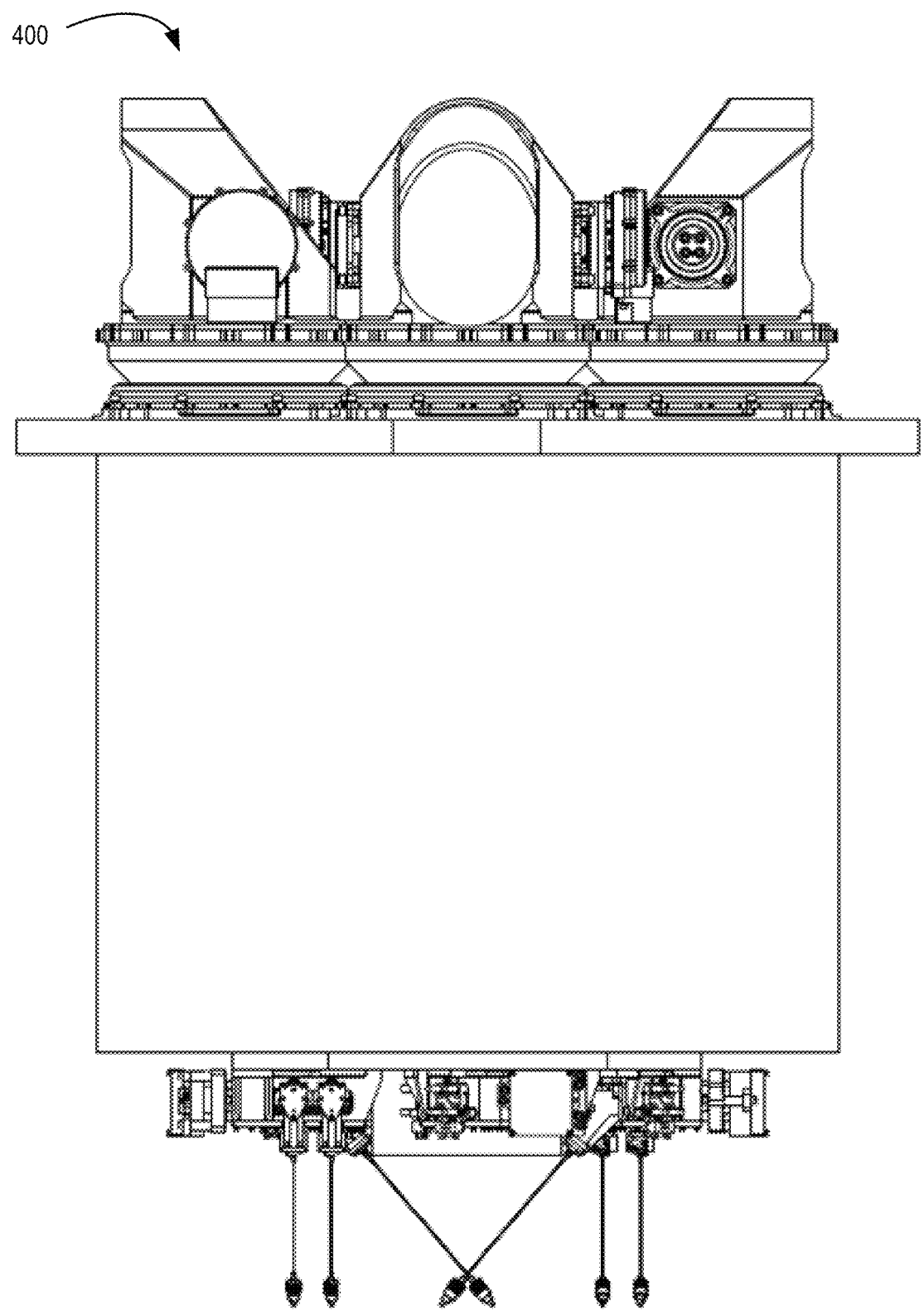
FIG. 7 shows a side view of the example optical signal transmission system of FIG. 6 in accordance with an embodiment.
Figure 8:
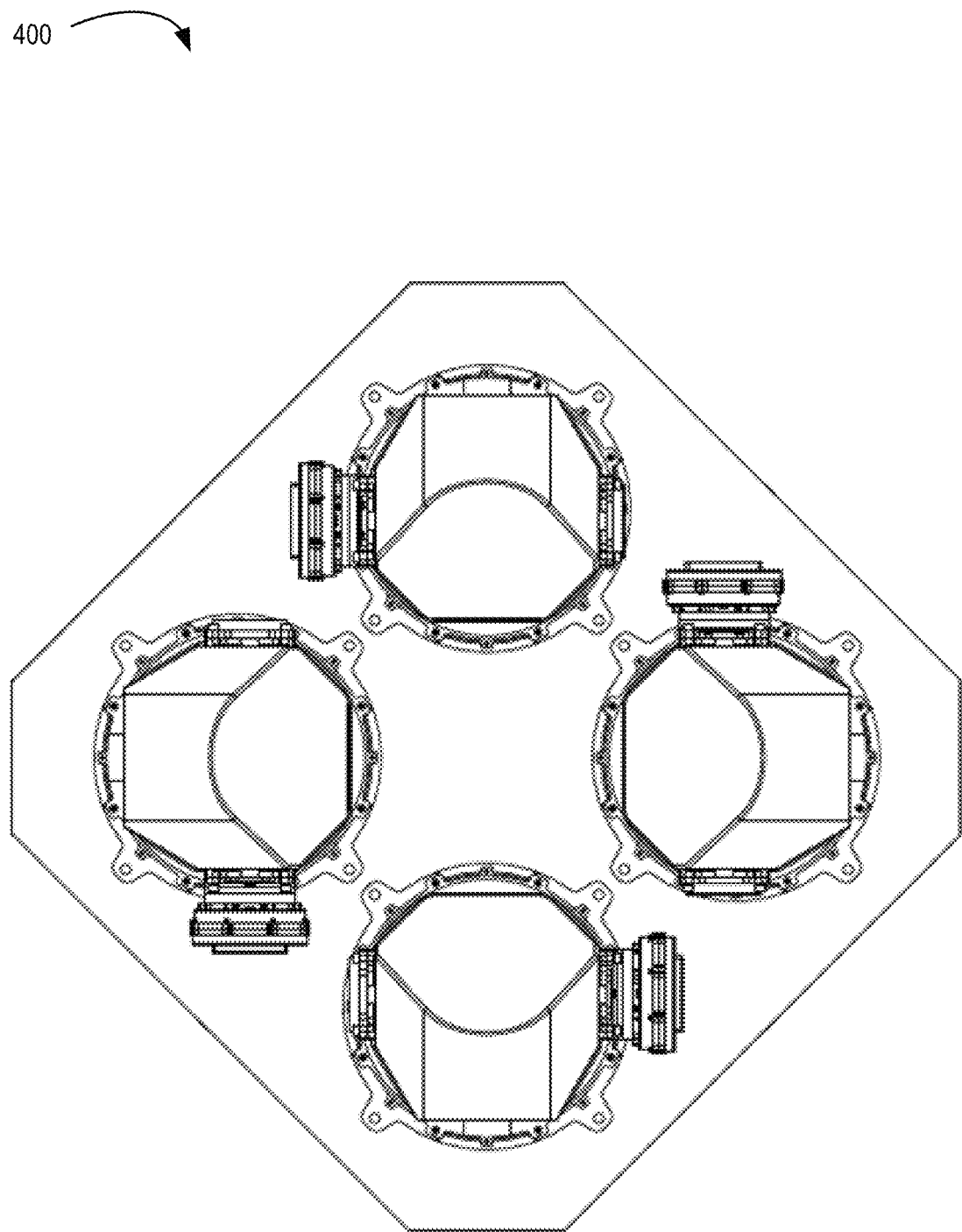
FIG. 8 shows a top view of the example optical signal transmission system of FIG. 6 in accordance with an embodiment.
Figure 9:
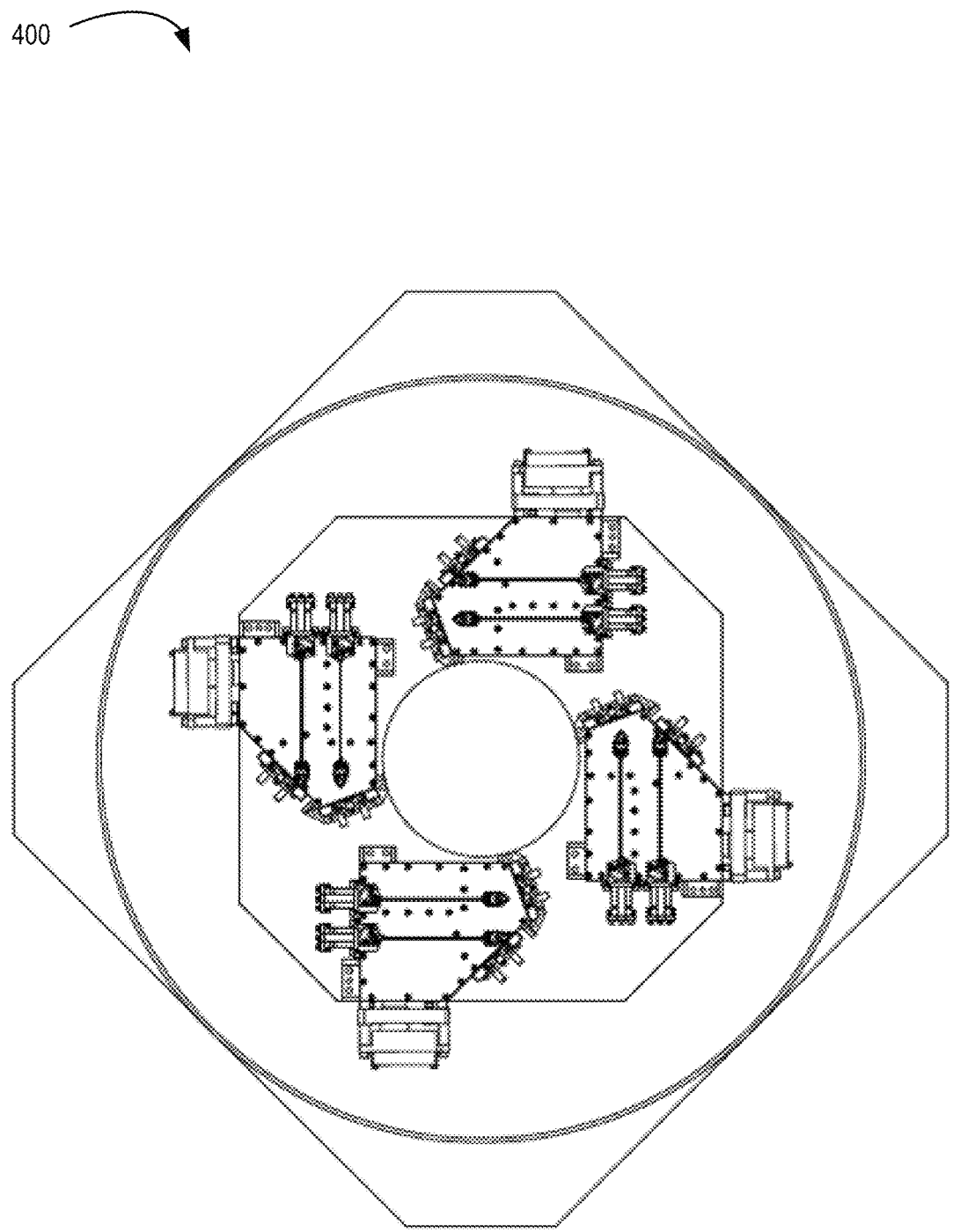
FIG. 9 shows a bottom view of the example optical signal transmission system of FIG. 6 in accordance with an embodiment.

Referring now to FIGS. 6 to 10, shown therein is an example of an optical system assembly 400. As shown in FIG. 6, an optical communication system 400 can include a plurality of communication paths contained within a combined housing assembly 405. Each communication path can extend between a communication terminal having an external aperture 320 and an internal aperture 114. As shown in the example illustrated, each external aperture 320 may be provided through a periscope 410 provided on the top of housing 400.

The combined housing assembly 400 can include a directional assembly for each communication path (e.g. coarse pointing assembly 310 and a fine pointing assembly such as fine pointing assembly 330). In addition, a shared telescope assembly 100 can be contained within the combined housing assembly 400 (see e.g. FIG. 10). The shared telescope assembly can include an optical train that is shared by each of the communication paths. As noted above, the optical train may be shared by each of the communication paths while signals in each communication path interact with distinct sections of each optical component in the optical train.

As with the terminal section 300, each communication path 120 in the optical communication system 400 can include an external optical assembly with an adjustable beam deflector. In the example illustrated, the beam deflector is provided in the form of a coarse pointing assembly 310. The external optical assembly (e.g. coarse pointing assembly 310) can be configured to receive an outgoing optical signal via an input aperture (e.g. apertures 102) and direct the optical signal towards the corresponding output terminal. The external optical assembly (e.g. coarse pointing assembly 310) can also be configured to receive an incoming optical signal via the output terminal and direct the optical signal towards the corresponding input aperture (e.g. apertures 102). The coarse pointing assembly 310 and output terminal may be adjusted to adjust the external communication direction of each communication path. For example, mirror 315 may be rotatable to provide a coarse pointing periscope.

Each external optical assembly may be adjustable between a range of angular directions. The range of angular directions can allow each external optical assembly to point towards a range of locations external to the optical system. For example, each external optical assembly may be adjustable through an angular range of about 120 degrees (e.g. a +/−60° azimuth range). The specific angular range of each external optical assembly may vary depending on the particular implementation. For example, the size of the overall communication system may be adjusted to account for desired angular ranges (e.g. the size may be increased to increase the angular range available to each external optical assembly). For example, for a configuration with an angular range of +/−95° (190° total azimuth range), the size of the overall communication system assembly may be approximately 25% larger than that required for a +/−60° azimuth range.

Alternately or in addition, each external optical assembly may be adjustable between a plurality of elevation angles within an elevation angular range. For example, each external optical assembly may be adjustable between elevation angles within an elevation angular range of about +/−15°.

Each external optical assembly may be independently adjustable in two dimensions (e.g. through an azimuthal angular range and an elevation angular range).

Although for ease of exposition, telescope assembly 100 and combined assembly 400 are described herein in the context of an optical communication system it should be understood that telescope assembly 100 and combined assembly may also be used in various other optical systems, such as optical imaging systems. For example, optical imaging systems may be provided in which image capture devices (e.g. cameras) are coupled to the input apertures 114 to allow a combined device to image multiple fields in different directions simultaneously. In such an example, each external optical assembly may be adjustable to point in a corresponding desired imaging direction.

Referring now to FIGS. 11A and 11B, there is shown another example embodiment of a telescope assembly 1100 that may be used in accordance with an embodiment.

The telescope assembly 1100 is generally analogous to the assembly 100 of FIG. 1B, except that the assembly 1100 is configurable to accommodate a larger number of communication signal paths. More specifically, while the example assembly 100 of FIG. 1B is exemplified with a small of number of internal apertures and corresponding external sub-apertures, the assembly 1100 may include 16, 24, or any desirable number of internal and corresponding external apertures. This, in turn, can allow assembly 1100 to accommodate, for example, a large number of concurrent external free space optical (FSO) communication links. In the illustrated example of FIGS. 11A and 11B, the assembly 1100 is able to accommodate 24 signal paths. FIGS. 11C and 11D illustrate the example footprint of the 24 sub-beams on each of the first mirror 104 of the shared optical train (FIG. 11C), as well as the footprint on the external sub-aperture array 102 (FIG. 11D).

It has, however, been appreciated that scalability challenges emerge when scaling the assembly 1100 to accommodate a larger number of communication paths.

For example, providing a large number of aperture-specific optical signals 120 requires providing a large number of internal apertures 114 and corresponding sub-apertures 102. This, in turn, demands precision beam routing to ensure that signals propagate—through the shared optical train—between the correct corresponding internal and external apertures 114, 102. In size-constrained designs, precision routing challenges are further accentuated as internal and external aperture arrays may be compactly arranged. Accordingly, small errors in beam routing may result in an aperture-specific signal 120 being slightly offset and routed to an incorrect internal or external aperture.

Related challenges also emerge in providing external optical assemblies for a large number of optical signal paths. For example, FIGS. 6-10 illustrate external assemblies 310 (e.g., coarse pointing assemblies) for a small number of communication paths 120. In the illustrated examples, each external assembly 310 includes an adjustable reflective beam deflector (e.g., a 2D gimbal mirror or coelostat). However, reflective beam deflectors may not be suited for assemblies with a large number of signal beams. For example, a large array of reflective deflectors (e.g., an array as shown in FIG. 11D)—on top of a housing assembly 405—can result in some reflective optical deflectors blocking the deflection range of other deflectors. For example, if each reflective optical deflector effects a maximum deflection angle of less than 180° from the incident signal propagation path, reflective optical deflectors in the center of a large array may be blocked by other deflectors positioned behind, in front and laterally to the center-positioned deflectors. In particular, a center-positioned deflector is blocked from deflecting signals by up to 90° due to the obstruction caused by surrounding deflectors.

Figure 12:
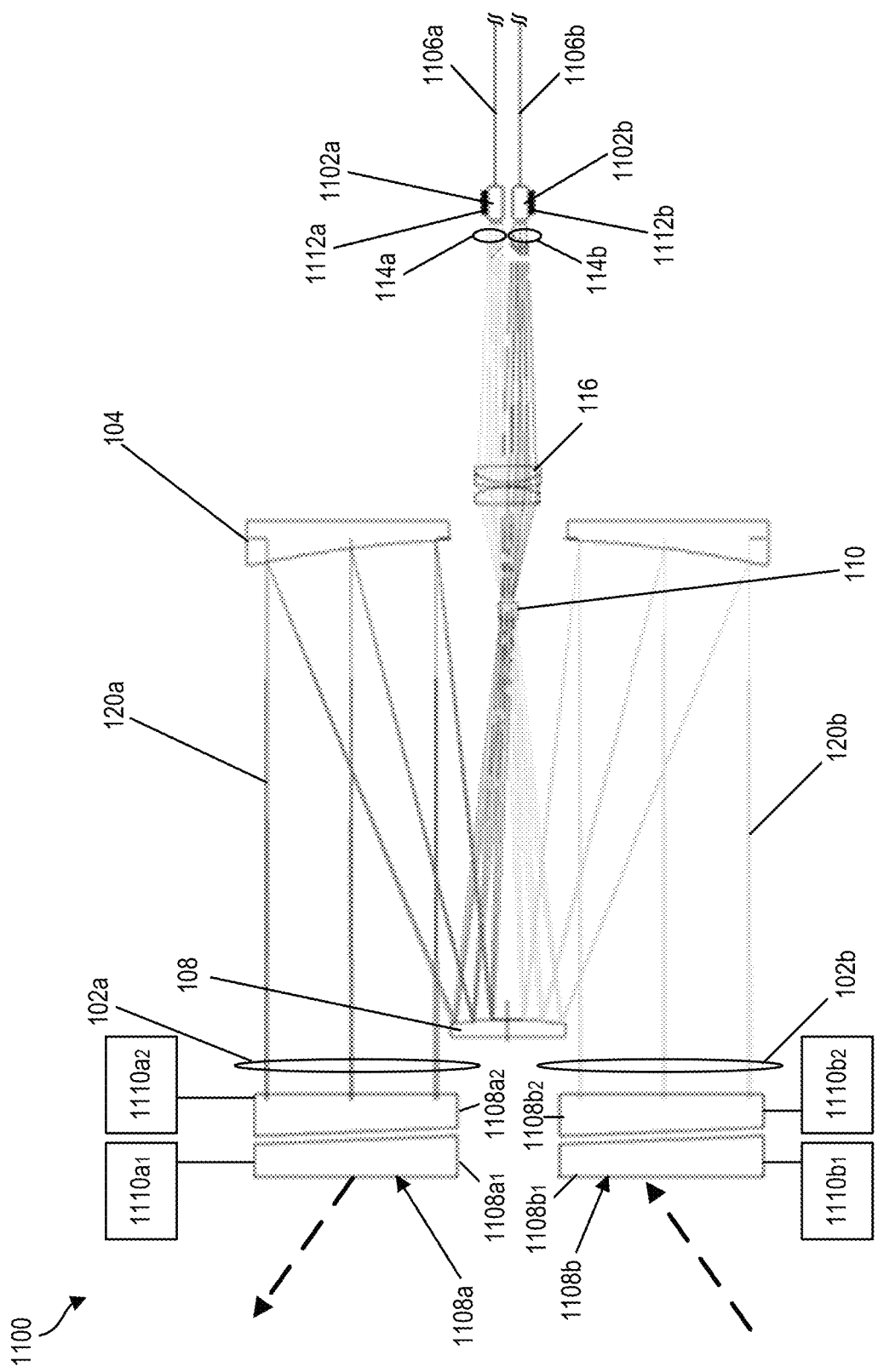
FIG. 12 shows a cross-sectional view of the example telescope assembly of FIG. 11A, taken along the cross-sectional line 11B-11B' of FIG. 11A, in accordance with another embodiment.

Referring now to FIG. 12, there is shown a cross-sectional view of the telescope assembly 1100 in accordance with an embodiment. For ease of exposition, FIG. 12 shows a telescope having only four communication paths, and a cross-sectional view showing only two of the communication paths. However, it will be appreciated that the same concept can be applied for a telescope accommodating any number of communication paths (e.g., 16, 24, etc.).

As shown, similar to assembly 100 of FIG. 1B, assembly 1100 includes a shared optical train for routing aperture-specific signals 120a, 120b between corresponding external sub-apertures 102a, 102b and internal apertures 114a, 114b. Each communication path has a corresponding optical train section that includes a specific portion of each optical train element for that communication path.

Assembly 1100 also includes a plurality of aperture-specific fine pointing optical assemblies 1102a, 1102b, as well as aperture-specific coarse pointing optical assemblies 1108a, 1108b. The plurality of fine pointing assemblies 1102 and coarse pointing assemblies 1108 are provided to allow the telescope assembly 1100 to scale to accommodate many communication paths.

As shown in FIG. 12, each internal aperture 114a, 114b includes a corresponding aperture-specific fine pointing assembly 1102a, 1102b. The fine pointing assemblies 1102 may each be coupled to respective fiber optic links 1106a, 1106b to receive optical signals therefrom (i.e., outgoing signals), or to transmit optical signals there through (i.e., incoming signals).

In particular, each of the fine pointing assemblies 1102 may be provided for fine beam steering of a corresponding optical signal. For example, fine pointing assemblies 1102 may ensure that outgoing optical signals are correctly directed through the shared optical train to propagate to the correct corresponding external sub-aperture 102. Similarly, incoming optical signals—arriving at each internal aperture 114 at a deflection angle—are deflected by the fine pointing assemblies 1102 into the corresponding fiber optic link 1106. In various cases, the fine pointing assemblies 1102 may also provide jitter stabilization to maintain accurate directional beam steering notwithstanding vibrational forces. In at least some embodiments, each of the fine pointing assemblies 1102 may be independently controllable to provide independent fine beam steering and jitter stabilization for a corresponding aperture-specific optical signal 120.

As further shown in FIG. 12, each fine pointing assembly 1102 may be sized to fit within a corresponding internal aperture 114. This, in turn, allows for a large array of compactly arranged internal apertures 114 and corresponding fine pointing assemblies 1102.

To size the fine pointing assemblies 1102 to fit within a corresponding internal aperture, each fine pointing assembly 1102 may be configured as a transmissive optical deflector. In contrast to reflective optical deflectors, transmissive deflectors are generally more compact. Further, unlike reflective deflectors, transmissive deflectors are able to deflect incident optical signals within a deflection range that includes the signal propagation path of the incident signal. In other words, if desired, transmissive deflectors can pass outgoing signals along the same propagation path as the incident optical signal, without deflection. By extension, this allows transmissive deflectors to effect finely-tuned deflections, of the incident optical signals, that are slightly offset from the incident signal propagation path. This, in turn, allows the transmissive deflector to be compactly positioned along the path of the fiber optic cable 1106 and to provide precision routing of incoming or outgoing signals.

In at least some embodiments, the transmissive fine pointing assemblies 1102 may be fiber coupled collimators, which are independently actuated via piezo-electric elements. In other embodiments, the fine pointing assemblies 1102 may include spatial light modulators (SLMs). The SLMs may be, for example, transmissive or reflective SLMs. Examples of transmissive SLMs include transmissive phase-only liquid crystal SLMs which effect fine beam steering by reconfiguring the phase retardation of light passing through various programmable SLM pixels (e.g., different voltages may be applied to different pixels of the SLM to effect different phase retardation). Examples of reflective SLMs may include phase-only liquid crystal on silicon (LCOS) SLMs, which also steer beams based on programmable SLM pixels. In some cases, each internal aperture 114 may include a corresponding independently controllable SLM for fine beam steering. In other cases, the array of aperture-specific fine pointing assemblies 1102 may be replaced by a single SLM, wherein different subsets of pixels in the SLM are designated (e.g., allocated) to different internal apertures 114. In particular, independent control of each subset of pixels may allow for fine beam steering of different aperture-specific optical signals 120 in different aperture-specific directions.

In various cases, the small deflections effected by the fine pointing assemblies 1102—to either incoming or outgoing optical signals from fiber optic links 1106—can also be used for point ahead or point behind corrections.

More specifically, point ahead and point behind corrections can be used to compensate for non-negligible time-of-flight considerations when the assembly 1100 communicates with an external terminal having a high relative velocity. In these cases, the corrections accommodate for the fact that—as between the time the optic signal is transmitted by the assembly 1100, and the time the optic signal is received at the external terminal—the receiving terminal may have shifted its position owing to its high relative velocity. Accordingly, the fine pointing assemblies 1102 may correct an optic signal's outgoing direction to accommodate for the position shift of the external terminal. Similar considerations also arise in the reverse case, when an external terminal is transmitting optic signals to the assembly 1100. In these cases, the fine pointing assemblies 1102 can effect small corrective deflections to incoming signals so as to properly route the received signal into the optical link 1106.

In the case of simplex communication, each fine pointing assembly 1102 can be independently controlled to effect pointing ahead or pointing behind corrections for transmitted or received signals.

In the case of duplex communication, however, a single fine pointing assembly 1102 may not be sufficient to effect corrections for both incoming and outgoing signals simultaneously. Accordingly, to accommodate for duplex communication, in some embodiments, it may be beneficial to include—within each internal aperture 114—two corresponding aperture-specific fine pointing assemblies 1102 which are coupled to respective fiber optic links 1106. The two aperture-specific fine pointing assemblies 1102 can include a first transmitting fine pointing assembly and a second receiving fine pointing assembly. The transmitting assembly may be dedicated to transmitting and effecting corrections to outgoing aperture-specific optic signals (e.g., deflecting the outgoing signal to effect point ahead or point behind corrections). The receiving assembly may be dedicated to receiving and effecting corrections to incoming aperture-specific optic signals (e.g., corrections to correctly deflect the incoming signals into the optic link). In this manner, the assembly 1100 can include two separate arrays of fine pointing assemblies 1102, one array dedicated to outgoing signals and one array dedicated to incoming signals.

In the case of duplex communication, transmitted and received aperture-specific signals may propagate through a common corresponding aperture-specific optical path 120, as between an external aperture 102 and an internal aperture 114. To ensure that the transmitted and received signals can be discriminated along the common optical path, the transmitted and received signals can be separately multiplexed/ de-multiplexed (e.g., using wavelength, polarization, frequency, or mode multiplexing). A multiplexer/de-multiplexer (e.g., one or more of an optical filter, polarization splitter or mode multiplexer/de-multiplexer) can be inserted between the first and second aperture-specific fine pointing assemblies 1102 and the telescope 1100 in order to couple optical signals in the transmit direction with the first transmitting fine pointing assembly, and optic signals in the receive direction with second receiving fine pointing assembly 1102.

In some situations, the assembly 1100 may also be used to communicate with several slow moving communication terminals (e.g., terminals mounted on ground, a high altitude platform, an unmanned aerial vehicle, an aircraft, a sea vessel, etc.), whereby the relative velocities are within a few hundred meters per second. In these cases, the point ahead or point behind corrections may be substantially the same as for all communication links. Accordingly, a single array of fine pointing assemblies 1102 may be sufficient in conjunction with a single correction mechanism which effects point ahead and/or point behind angular correction to all transmitted and received beams concurrently. Further, a pair of optical filters, polarization splitters, mode multiplexers/de-multiplexers and one or more mirrors can also be inserted between the fine pointing assemblies 1102 and the telescope 1100—and/or otherwise between the telescope 1100 and sub-apertures 102—to generate discriminated light paths between transmitted and received signals using a single corrective beam deflection mechanism (e.g., a reflector or transmitter) which imparts the controllable point ahead or point behind correction onto all beams simultaneously.

Referring still to FIG. 12, assembly 1100 also includes an array of aperture-specific coarse pointing assemblies 1108 (e.g., external optical assemblies). Each coarse pointing assembly 1108 may be configurable to independently steer, over wide angles, outgoing aperture-specific signals 120 to desired external destinations (e.g., other optical terminals). The coarse pointing assemblies 1108 may also direct incoming aperture-specific optical signals 120 through appropriate portions of the optical train to arrive at a corresponding internal aperture 114.

As shown, similar to the fine pointing assemblies 1102, each of the coarse pointing assemblies 1108 may also preferably comprise a transmissive optical deflector. For instance, as shown in the illustrated example embodiment, the coarse pointing assemblies 1108 may each include Risley prism pairs. Other examples transmissive optical deflectors include acousto-optic or electro-optic beam deflectors.

In particular, as compared to the reflective optical deflector array shown in FIG. 6 (e.g., using 2D gimbal-mirror or coelostat designs)—a large array of transmissive deflectors may be compactly arranged to accommodate a large number of signal paths without encountering similar problems of center-positioned transmissive deflectors being obstructed by other deflectors located, for example, behind, in-front or lateral to the central transmissive deflectors. In other words, the use of transmissive coarse pointing assemblies 1108 enables for scaling the assembly 1100 to concurrently handle a large number of communication paths.

In various cases, independent control of the coarse pointing assemblies 1108 may allow for controlling different coarse pointing assemblies 1108 to direct or receive aperture-specific optical signals 120 from different external destinations. In other words, each coarse pointing assembly 1108 may be allocated for a different FSO communication link.

Independent control of coarse pointing assemblies 1108 may also allow for redundancy by re-assigning one or more coarse pointing assemblies 1108 to cover (e.g., compensate) for defective links. Defective links may result, for example, from damaged components amongst the coarse pointing assemblies 1108, fine pointing assemblies 1102 or transmit/receive units 1612,1626 (FIG. 16). In these cases, the defective link may be compensated by controlling a less frequently used coarse pointing assembly 1108 corresponding to a less frequently used communication link, or an unused coarse pointing assembly 1108 that was configured as a redundant unit and not otherwise pre-assigned to any communication link, to direct or receive optical signals from an external destination associated with the defective link.

In some embodiments, each coarse pointing assembly 1108 may be configured (e.g., pre-configured, pre-designed, or otherwise independently controllable) to direct outgoing optical signals within a pre-defined deflection range. In other words, each coarse pointing assembly 1108 may be dedicated (e.g., allocated) to steering aperture-specific optical signals 120 within a corresponding aperture-specific deflection range. In this manner, assembly 1100 can be adapted to transmit optical signals over a wide overall deflection range, wherein the wide range is composed of multiple sub-deflection ranges corresponding to each coarse pointing assembly 1108. In various cases, this configuration may ease the specification on the coarse pointing assemblies 1108 (e.g., limiting the steering range for each assembly), while potentially avoiding issues with inaccessible locations in the assembly 1100's field of view and/or over-resolved control loops for the coarse pointing assemblies 1108.

Figure 13:
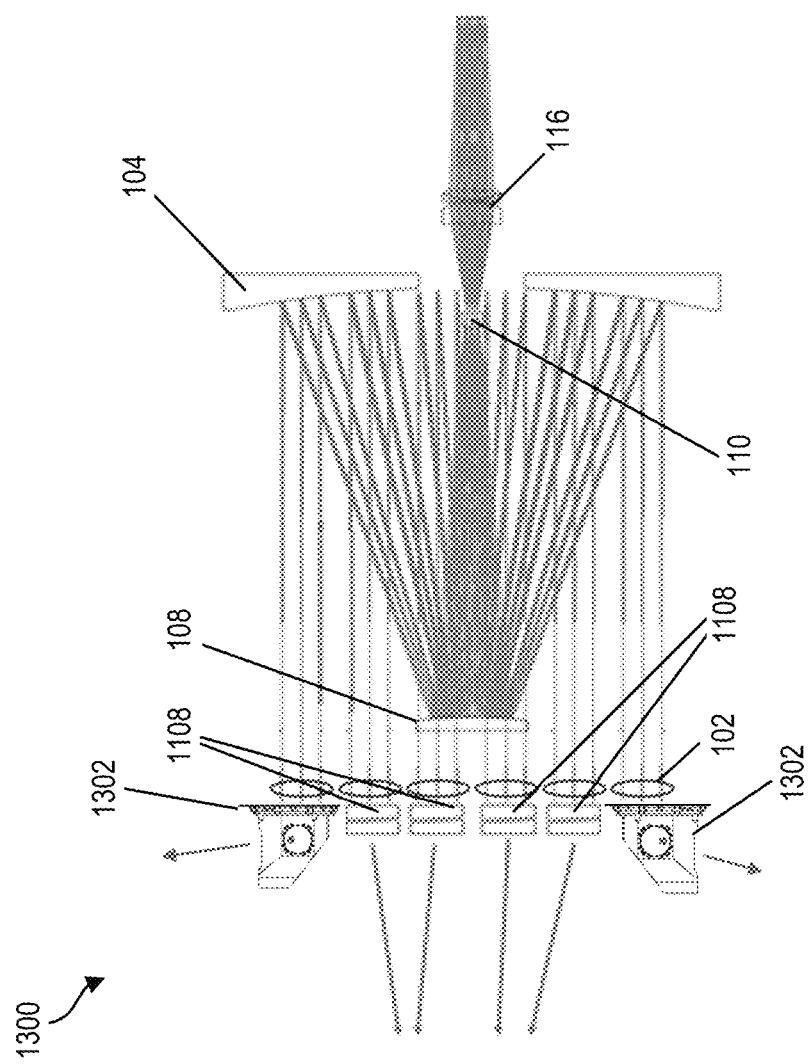
FIG. 13 shows a cross-sectional view of the example telescope assembly of FIG. 11A, taken along the cross-sectional line 11B-11B' of FIG. 11A, in accordance with still another embodiment.

While the assembly 1100 has been illustrated with an array of transmissive coarse pointing assemblies 1108, it will be appreciated that in other embodiments, the assembly 1100 may also include one or more reflective coarse pointing assemblies. For example, referring now to FIG. 13, which shows an example telescope assembly 1300 according to some other embodiments. The telescope assembly 1300 is generally analogous to the assembly 1100, with the exception that the array of coarse pointing assemblies additionally includes one or more reflective coarse pointing assemblies 1302 (e.g., 2D gimbal-mirrors or coelostats). In the illustrated example, the reflective assemblies 1302 are positioned at the outer edges of the coarse pointing array to prevent the reflective assemblies 1302 from obstructing the signal path of other coarse pointing assemblies in the array. In at least some embodiments, the reflective assemblies 1302 may enable beam steering in a direction substantially perpendicular to the telescope boresight.

Figure 14:
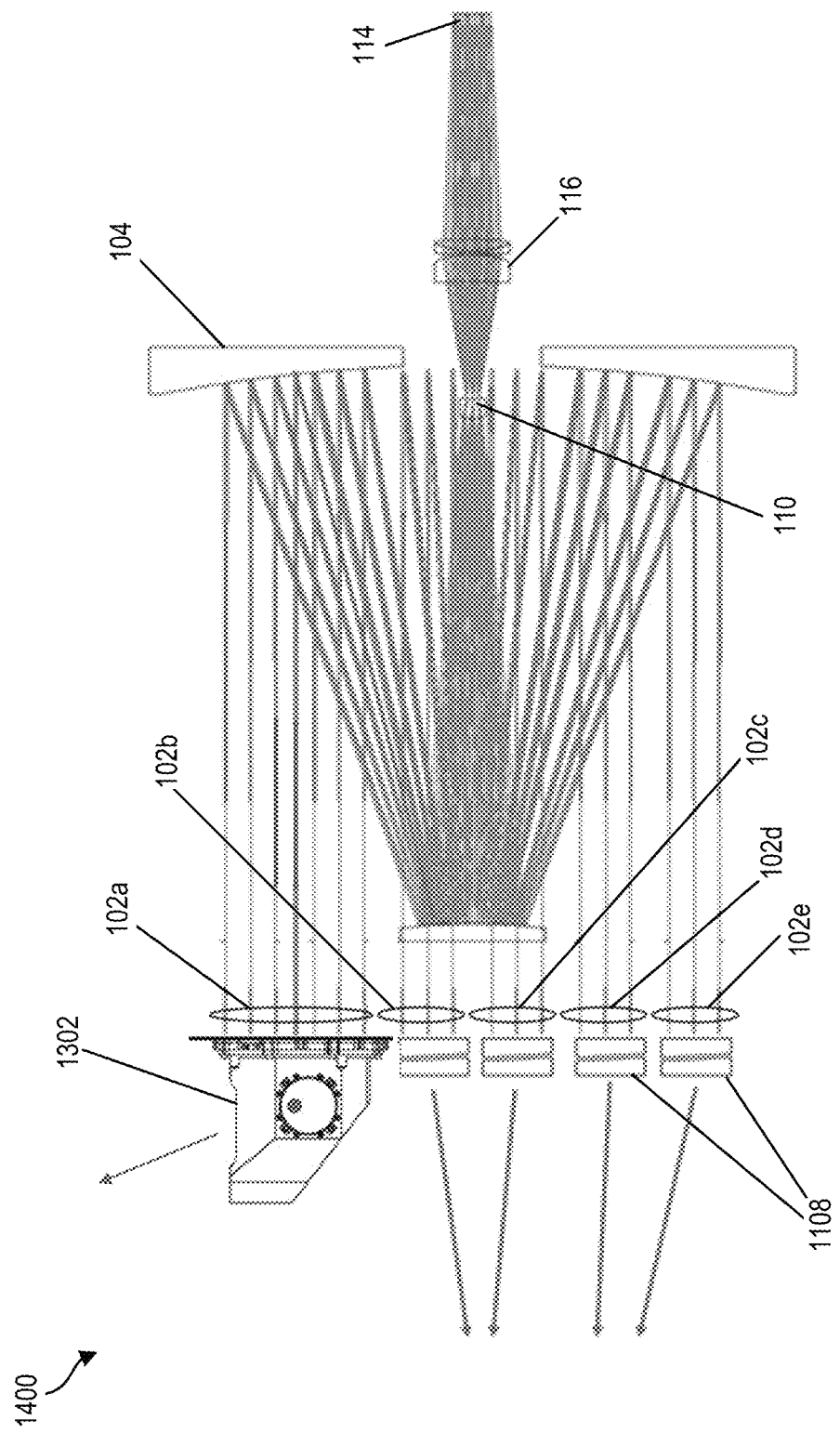
FIG. 14 shows a cross-sectional view of the example telescope assembly of FIG. 11A, taken along the cross-sectional line 11B-11B' of FIG. 11A, in accordance with still yet another embodiment.

Referring now to FIG. 14, which shows a telescope assembly 1400 according to still another embodiment. The telescope assembly 1400 is generally analogous to the telescope assembly 1300 with the exception that the external sub-aperture 102*a*—corresponding to the reflective assembly 1302—is larger than the sub-apertures 102*b*-102*e* corresponding to the transmissive coarse pointing assemblies 1108. In particular, in various cases, this arrangement can allow the reflective assembly 1302 to transmit signals over longer distances due to lower divergence of light beams exiting the larger sub-aperture 102*a* and/or otherwise accommodate a larger communication bandwidth. In some cases, transmitting at larger communication bandwidths may be desirable when optical signals are communicated to gateway connections which require high communication bandwidth links (e.g., a gateway satellite), as opposed to single end user links. In various embodiments, to accommodate for the larger sub-aperture 102*a*, the internal aperture 114 corresponding to the sub-apertures 102a may also have a larger size (not shown). In other words, the corresponding internal aperture 114 for the larger sub-aperture 102a may include a larger fine pointing assembly. In other cases, the larger sub-aperture 102a may be accommodated by designating a number of corresponding smaller internal apertures 114 to transmit optical signals to the larger sub-aperture 102a. That is, multiple aperture-specific fine pointing assemblies 1102 may be configured to direct multiple outgoing aperture-specific optical signals 120 to the same sub-aperture 102a.

In some cases, transmissive coarse pointing assemblies 1108 may also have a larger corresponding sub-aperture 102 to also transmit at a larger communication bandwidth and/or over longer distances. In still other cases—in addition to or in the alternative of providing larger sub-apertures 102—multiple transmissive or reflective coarse pointing assemblies may also be pre-configured or controlled to steer multiple aperture-specific optical signals 120 in a common direction to increase the optical power of the transmitted beam.

Referring now back to FIG. 12, in order to provide independently controllable fine and coarse pointing assemblies, one or more of the fine and coarse pointing assemblies may be each coupled to an independent driving (or actuation) mechanism. For example, driving mechanisms (e.g., drive motors) 1110a, 1110b may couple to each (or one or more) of the transmissive coarse pointing assemblies 1108a, 1108b. In the illustrated example, the driving mechanisms 1110$a_1$ and 1110$a_2$ may re-configure the orientation of each of prism 1108$a_1$ and 1108$a_2$ of the Risley prism pair 1108a, respectively, to achieve a desired coarse beam steering direction, either for incoming or outgoing signals. Similarly, the driving mechanisms 1110$b_1$ and 1110$b_2$ may also re-configure the orientation of each prism 1108$b_1$ and 1108$b_2$ of the Risley prism pair 1108b, respectively. While not illustrated, driving mechanisms may also be provided for controlling reflective coarse pointing assemblies (e.g., 1302 in FIG. 13). Similarly, each of the fine-pointing assemblies 1102a, 1102b may also include respective actuation mechanisms 1112a, 1112b which independently control the fine pointing assembly to achieve desired fine point steering. The actuating mechanisms may, for example, actuate piezo elements in fiber coupled collimators to vary fine beam steering direction, or otherwise control the applied voltage to different SLM pixels in an SLM-based fine pointing assembly.

Figure 15:
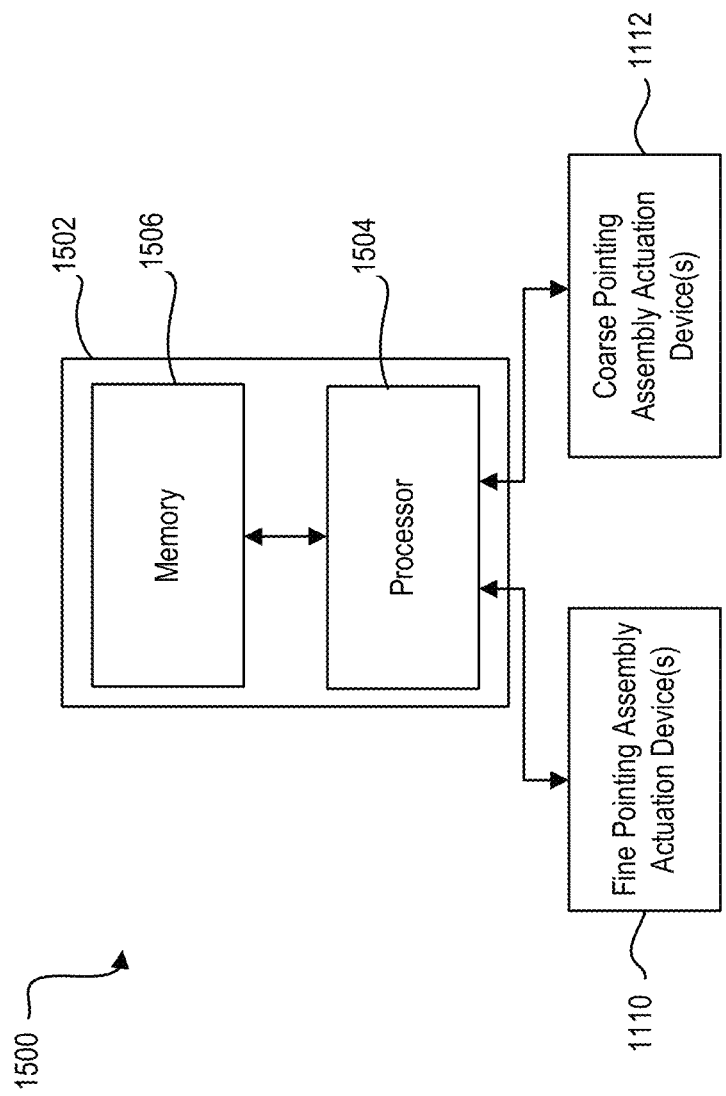
FIG. 15 shows a simplified block diagram for an example control circuit for a telescope assembly.

Referring now to FIG. 15, which shows a simplified block diagram 1500 for an example circuit for controlling the actuation devices for each of the coarse and fine pointing assemblies. As shown, the example circuit includes a controller 1502 coupled to a plurality of fine pointing assembly actuation device(s) 1100 and coarse pointing actuation device(s) 1112. Controller 1502 may include a processor 1504 coupled to a memory 1506. In various cases, although not shown, controller 1502 may also include other communication components (e.g., antennas, etc.) to receive remote control instructions or to transmit status updates to remote locations.

Processor 1504 of controller 1502 is a computer processor, such as a general purpose microprocessor. In some other cases, processor 1504 may be a field programmable gate array, application specific integrated circuit, microcontroller, or other suitable computer processor.

Processor 1504 is coupled, via a computer data bus, to memory 1506. Memory 1506 may include both volatile and non-volatile memory. Non-volatile memory stores computer programs consisting of computer-executable instructions, which may be loaded into volatile memory for execution by processor 1504 as needed. It will be understood by those of skill in the art that references herein to as controller 1502 as carrying out a function or acting in a particular way imply that processor 1504 is executing instructions (e.g., a software program) stored in memory 1506 and possibly transmitting or receiving inputs and outputs via one or more interface. Memory 1506 may also store data input to, or output from, processor 1504 in the course of executing the computer-executable instructions. In various cases, memory 1506 may store instructions for controlling the fine and coarse pointing assemblies.

In at least some embodiments, the controller 1502 may independently control each of the coarse pointing assembly actuation devices 1112 to configure a corresponding coarse pointing assembly to route outgoing optical signals to a desired external routing destination. Accordingly, this may allow a telescope assembly (e.g., telescope 100, 200, 300 or 1100) to route each individual aperture-specific optical signal to separate destinations, or to the same destination. Controller 1502 may also independently control each of the coarse pointing assembly actuation devices 1112 to configure a corresponding coarse pointing assembly to correctly direct incoming external optical signals, through the shared optical train, toward a corresponding internal aperture 114.

In still other cases, controller 1502 can also independently control each of the fine pointing assembly actuation devices 1110, corresponding to each of the fine pointing assemblies. This, in turn, may allow controller 1502 to control different fine pointing assemblies to correctly direct outgoing aperture-specific optical signals 120 to a corresponding external aperture 102. It may also allow independent control of fine pointing assemblies to correctly deflect incoming aperture-specific optical signals 120 into coupled fiber optic cables. In still other cases, controller 1502 may control fine pointing assemblies to provide independent jitter stabilization.

In various cases, controller 1502 may also receive information or data from the fine and coarse pointing actuation devices 1110, 1112, including, for example, position sensor readings from associated position sensors included in these devices.

Referring now to FIG. 16, shown therein is an example of a signal transceiver unit 1600 in accordance with an embodiment. Signal transceiver unit 1600 may be used with an optical system that includes a telescope assembly such as telescope assembly 100 and/or combined assembly 400. For example, signal transceiver unit 1600 may be used to provide an optical laser communication system.

As shown in FIG. 16, signal transceiver unit 1600 can include a signal transmission path 1610 and a signal reception path 1620. The signal transmission path 1610 and signal reception path 1620 are coupled to an input aperture 114. The input aperture 114 can couple signals between the optical train of telescope assembly 100 and the signal transmission path 1610 and signal reception path 1620. Depending on the particular implementation of an optical system, a signal transceiver unit may be configured with only one of the signal transmission path 1610 and signal reception path 1620, or with a combined single path enabling bi-directional communication.

As shown in FIG. 16, the signal transmission path 1610 and signal reception path 1620 are coupled to a modem 1602. The modem 1602 can be configured to perform various signal processing operations on the outgoing signal(s) to be transmitted through signal transmission path 1610 and/or the incoming signal(s) received through signal reception path 1620, including clock recovery, forward error correction and frame signaling.

The signal transceiver unit 1600 can be configured to convert the signals between an optical form (for transmission through the telescope assembly and external optical assembly) and alternate formats that may be used for internal transmission and/or communication to devices using other communication formats, such as Ethernet or radio-frequency formats for example.

Transmission unit 1612 can be configured to convert outgoing signals from an alternate communication and/or processing format (e.g. Ethernet) into optical signals. The transmission unit 1612 can be configured to modulate outgoing signals for transmission as an optical laser signal along signal transmission path 1610. For example, transmission unit 1612 may include a laser light source. Transmission unit 1612 may also include an external or integrated optical modulator such as an electro-absorption modulator (EAM) or a Lithium Niobate Mach Zehnder external modulator for example. The optical modulator may be operable to modulate the laser light source to generate an outgoing optical laser signal to be transmitted along the signal transmission path 1610 to aperture 114.

The outgoing optical laser signal can be further processed along the signal transmission path 1610 before reaching the aperture 114 (i.e. before passing through telescope assembly 100). For example, an optical amplifier 1614 may be provided along the signal transmission path 1610 to amplify the outgoing optical signals prior to entering the telescope assembly 100.

Reception unit 1626 can be configured to convert incoming signals from optical signals into an alternate communication and/or processing format (e.g. Ethernet). The reception unit 1626 can be configured to demodulate incoming optical laser signal(s) received through signal reception path 1620. For example, the reception unit 1626 can include a photodiode. Incoming optical signals can be received by the photodiode and a corresponding electrical signal can be generated in response. Reception unit 1626 may also include various electrical signal processing components, such as a transimpedance electrical amplifier and/or one or more signal filters (e.g. a bandpass filter).

The incoming optical laser signal may be further processed along the signal reception path 1620 before reaching the reception unit 1626. For example, the incoming optical signals may pass through an optical amplifier 1622 after being received through aperture 114 (i.e. after passing through telescope assembly 100). The optical amplifier 1622 can amplify the incoming optical signal before it reaches reception unit 1626. The incoming optical signals may also pass through an optical filter 1624. For example, optical filter 1624 may be a bandpass optical filter. The optical filter 1624 can be defined to remove noise and/or background signal components in the incoming optical signal before it reaches reception unit 1626.

In some examples, the transmission unit 1612 and reception unit 1626 may be implemented using a combined transceiver module.

Modem 1602 may be configured to perform various processing operations on the incoming and outgoing signals passing therethrough. For example, the modem 1602 can be configured to perform various forward error correction operations on the incoming and/or outgoing signals.

Although the aperture 114 is shown as being separately coupled to the signal transmission path 1610 and the signal reception path 1620, it should be understood that additional optical components (e.g. beam splitters) may be used to provide a combined signal path that extends between the transmission path 1610 and reception path 1620 and aperture 114.

In some examples, the transceiver unit 1600 may be configured to concurrently transmit/receive multiple signals along the signal transmission path 1610 and the signal reception path 1620 respectively.

In some examples, various signal modulation techniques (e.g. wavelength division multiplexing, polarization multiplexing etc.) may be used to allow multiple different signals to be communicated along a shared signal path (e.g. multiple signals may be concurrently transmitted along the signal transmission path 1610, signal reception path 1620, and/or a combined signal path).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An optical system comprising:
a plurality of internal apertures, wherein each internal aperture is operable to receive a corresponding aperture-specific optical signal;
a plurality of coarse pointing optical assemblies, each of the plurality of coarse pointing assemblies receiving one or more corresponding aperture-specific optical signals, each coarse pointing optical assembly being independently controllable to deflect the received one or more corresponding aperture-specific optical signals in a corresponding signal-specific direction;
a telescope assembly positioned intermediate the plurality of internal apertures and the plurality of coarse pointing optical assemblies, the telescope assembly defining a shared optical train arranged to direct aperture-specific optical signals between corresponding internal apertures and coarse pointing assemblies; and
a plurality of aperture-specific fine pointing optical assemblies, each of the plurality of fine pointing assemblies being sized to fit within a corresponding internal aperture, wherein each of the fine pointing assemblies is operable to receive a corresponding aperture-specific optical signal having a respective signal-specific propagation direction, and each of the fine pointing assemblies is independently controllable to deflect the corresponding aperture-specific optical signal within a deflection range, the deflection range including the corresponding signal-specific propagation direction.

2. The optical system of claim 1, wherein each of the plurality of aperture-specific fine pointing assemblies comprise transmissive optical deflector assemblies.

3. The optical system of claim 2, wherein at least a subset of the plurality of aperture-specific fine pointing assemblies comprise piezo actuated fiber collimators.

4. The optical system of claim 1, wherein at least a subset of the plurality of aperture-specific fine pointing assemblies comprise a spatial light modulator (SLM).

5. The optical system of claim 4, wherein the SLM comprises one of a reflective SLM and a transmissive SLM.

6. The optical system of claim 1, wherein a subset of the plurality of coarse pointing optical assemblies comprise transmissive optical deflectors.

7. The optical system of claim 6, wherein the subset of the plurality of coarse pointing assemblies comprise Risley prism pair optical deflectors.

8. The optical system of claim 6, wherein the subset of the plurality of coarse pointing assemblies comprise at least one of acousto-optic deflectors or electro-optic deflectors.

9. The optical system of claim 1, wherein one or more of the plurality of coarse pointing assemblies comprise reflective optical deflectors.

10. The optical system of claim 9, wherein the reflective optical deflectors comprise at least one of gimbal mounted optical mirrors and coelostats.

11. The optical system of claim 9, wherein the plurality of coarse pointing assemblies are arranged in an assembly array, and the reflective optical deflectors are positioned proximate an outer edge of the array so as to avoid obstructing neighboring optical signal paths.

12. The optical system of claim 1, wherein the optical system is an optical laser communication system.

13. The optical system of claim 1, wherein each of the plurality of internal apertures is of substantially equal size.

14. The optical system of claim 1, wherein at least one of the plurality of internal apertures is of different size than the remaining internal apertures of the plurality of internal apertures.

15. The optical system of claim 1, wherein, an external direction extends from the plurality of internal apertures towards the plurality of coarse pointing assemblies, and each of at least a subset of the plurality of coarse pointing assemblies is designated to deflect corresponding aperture-specific optical signals, propagating along the external direction, in a different corresponding aperture-specific deflection range.

16. The optical system of claim 1, further comprising a controller coupled to each of the plurality of coarse pointing assemblies and the plurality of fine pointing assemblies, the controller being operable to control a deflection direction of each of the plurality of coarse pointing assemblies and the plurality of fine pointing assemblies.

17. The optical system of claim 16, wherein, an external direction extends from the plurality of internal apertures towards the plurality of coarse pointing assemblies, and the controller is configured to control at least one of the plurality of coarse pointing assemblies to re-direct an external propagation direction of a corresponding aperture-specific optical signal, propagating along the external direction, to accommodate for a defective communication link.

* * * * *